United States Patent
Shimogawa

(10) Patent No.: US 9,678,768 B2
(45) Date of Patent: Jun. 13, 2017

(54) MANAGEMENT SYSTEM, MANAGEMENT APPARATUS, AND MANAGEMENT METHOD

(71) Applicant: FUJITSU LIMITED, Kawasaki-shi, Kanagawa (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 1096 days.

(21) Appl. No.: 13/757,009

(22) Filed: Feb. 1, 2013

(65) Prior Publication Data

US 2013/0205297 A1    Aug. 8, 2013

(30) Foreign Application Priority Data

Feb. 2, 2012    (JP) ................... 2012-020625

(51) Int. Cl.
*G06F 15/173*    (2006.01)
*G06F 9/455*    (2006.01)
*G06Q 10/00*    (2012.01)

(52) U.S. Cl.
CPC .......... *G06F 9/455* (2013.01); *G06F 9/45558* (2013.01); *G06Q 10/00* (2013.01)

(58) Field of Classification Search
CPC ...... G06Q 20/145; G06Q 30/02; G06Q 10/06; G06F 9/5011
USPC ..... 705/34, 400, 412, 1.1, 26.1, 7.35; 718/1, 718/104; 709/224, 226, 229
See application file for complete search history.

(56) References Cited

U.S. PATENT DOCUMENTS

| 2002/0069369 | A1 | 6/2002 | Tremain |
| 2010/0036698 | A1* | 2/2010 | Garrison ................ G06Q 20/20 705/16 |
| 2012/0102050 | A1* | 4/2012 | Button .................... G06N 5/043 707/749 |
| 2012/0260248 | A1* | 10/2012 | Katiyar ............... G06F 9/45533 718/1 |
| 2014/0297491 | A1* | 10/2014 | Cao ...................... G06Q 20/145 705/34 |

FOREIGN PATENT DOCUMENTS

| JP | 2004-503011 | 1/2004 | |
| JP | 2011-76506 | 4/2011 | |
| JP | WO 2012173604 A2 * | 12/2012 | ............. G06Q 30/02 |
| JP | WO2012173604 A2 * | 12/2012 | ............. G06Q 30/02 |
| JP | WO 2012173604 A3 * | 12/2013 | ............. G06Q 30/02 |
| WO | WO 02/03220 A2 | 1/2002 | |

* cited by examiner

Primary Examiner — Shannon Campbell
Assistant Examiner — Freda A Nelson
(74) Attorney, Agent, or Firm — Staas & Halsey LLP

(57) ABSTRACT

A system includes a physical machine that controls a virtual machine to execute a processing by using hardware resources of the physical machine, and a management apparatus includes a processor configured to execute: detect a first quantity of the hardware resources used by the virtual machine larger than a specific quantity set based on a second quantity of the hardware resources assigned to the virtual machine in accordance with a first usage fee corresponding to the virtual machine, calculate a second usage fee of the virtual machine based on a third quantity larger than the second quantity, and modify the second quantity to meet with the third quantity when the second usage fee is lower than the first usage fee.

7 Claims, 22 Drawing Sheets

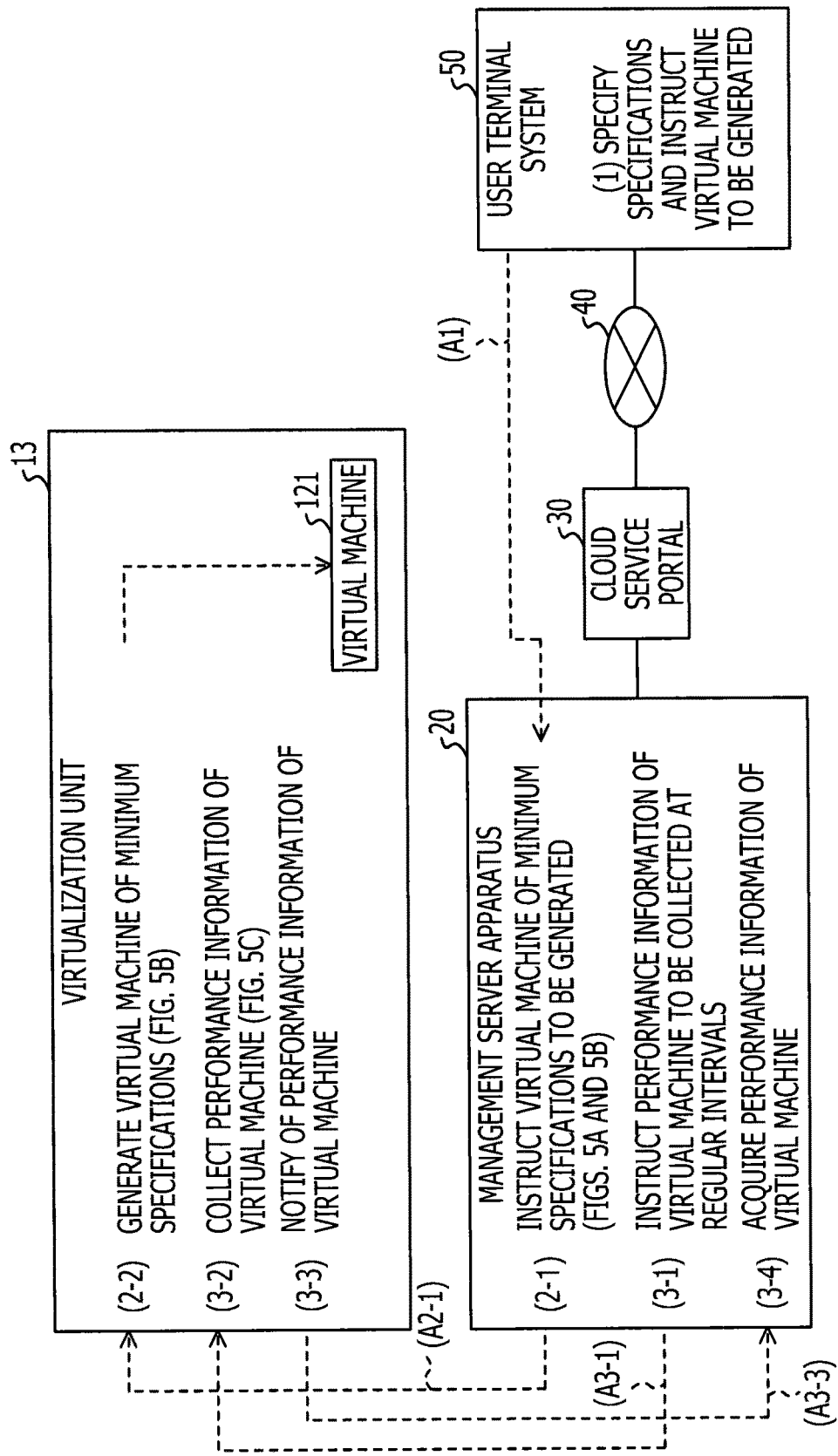

FIG. 5A

| ITEMS | MAX PRICE |
|---|---|
| DESCRIPTION | MAXIMUM FEE |
| STORED EXAMPLE | 4.0 DOLLARS/h |

| ITEMS | CORE | CLOCK | MEMORY | DISK BAND | NETWORK BAND | DISK IO |
|---|---|---|---|---|---|---|
| DESCRIPTION | ASSIGNED CORE COUNT | ASSIGNED CLOCK COUNT | ASSIGNED MEMORY CAPACITY | ASSIGNED DISK BAND | ASSIGNED NETWORK BAND | ASSIGNED DISK IO FREQUENCY |
| STORED EXAMPLE | 1 | 1.5GHz | 4GB | 100MB/Sec | 1Gbps | 400/IOPS |

| ITEMS | CORE | CLOCK | MEMORY | DISK BAND | NETWORK BAND | DISK IO |
|---|---|---|---|---|---|---|
| DESCRIPTION | ASSIGNED CORE COUNT | ASSIGNED CLOCK COUNT | ASSIGNED MEMORY CAPACITY | ASSIGNED DISK BAND | ASSIGNED NETWORK BAND | ASSIGNED DISK IO FREQUENCY |
| STORED EXAMPLE | 1 | 1.2GHz | 1.2GB | 40MB/Sec | 0.8Gbps | 200/IOPS |

T3

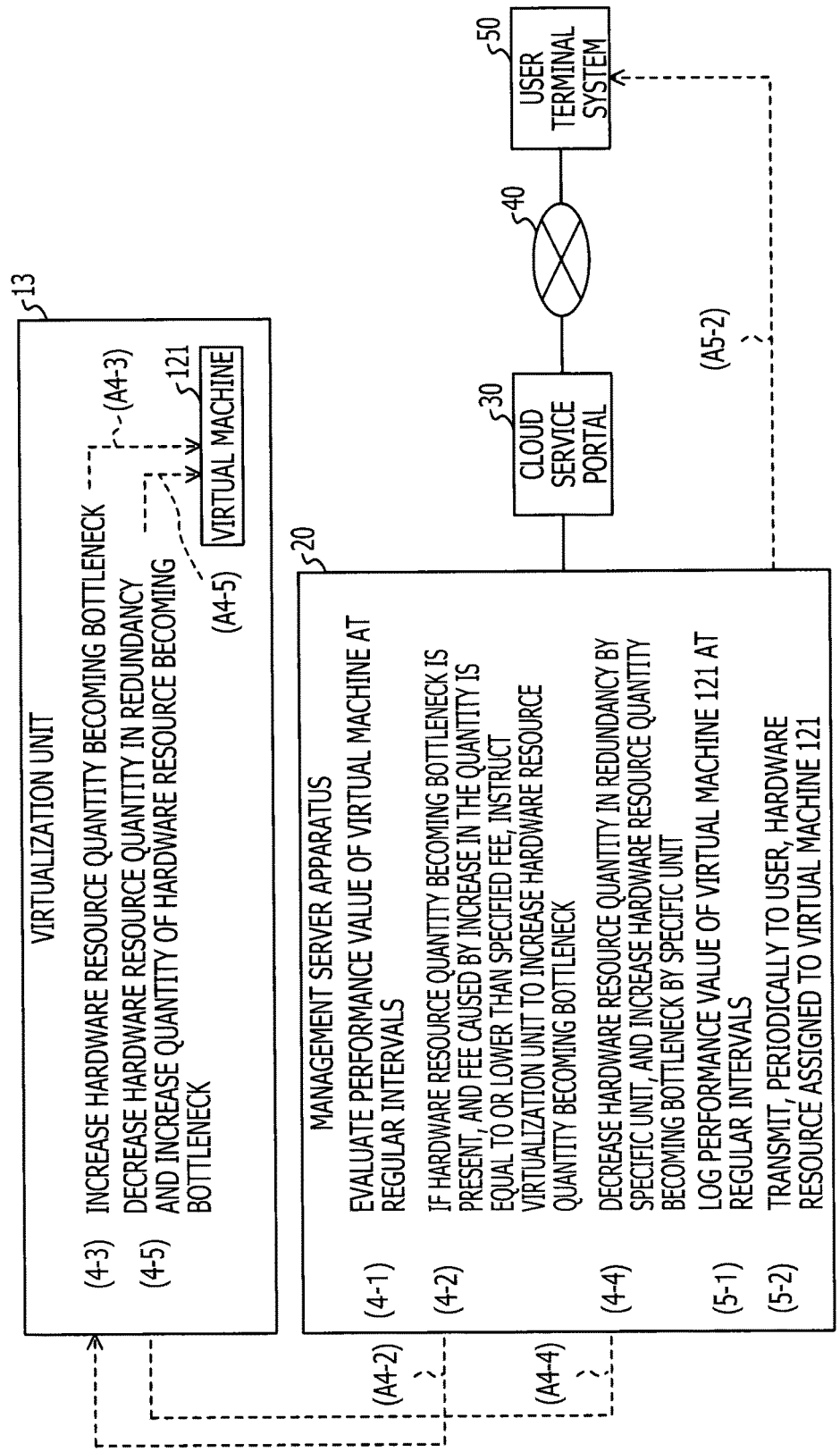

| ITEMS | CORE | CLOCK | MEMORY | DISK BAND | NETWORK BAND | DISK IO |
|---|---|---|---|---|---|---|
| DESCRIPTION | UPPER LIMIT CORE COUNT | UPPER LIMIT CLOCK COUNT | UPPER LIMIT MEMORY CAPACITY | UPPER LIMIT DISK BAND | UPPER LIMIT NETWORK BAND | UPPER LIMIT DISK IO FREQUENCY |
| STORED EXAMPLE | 1 | 1.2GHz | 3.2GB | 80MB/Sec | 0.8Gbps | 320/IOPS |

| ITEMS | CORE | CLOCK | MEMORY | DISK BAND | NETWORK BAND | DISK IO |
|---|---|---|---|---|---|---|
| DESCRIPTION | UNIT OF CORE COUNT | UNIT OF CLOCK COUNT | UNIT OF MEMORY CAPACITY | UNIT OF DISK BAND | UNIT OF NETWORK BAND | UNIT OF DISK IO FREQUENCY |
| STORED EXAMPLE | 1 | 0.2GHz | 0.2GB | 10MB/Sec | 0.2Gbps | 20/IOPS |

| ITEMS | CORE | CLOCK | MEMORY | DISK BAND | NETWORK BAND | DISK IO |
|---|---|---|---|---|---|---|
| DESCRIPTION | FEE PER UNIT CORE COUNT | FEE PER UNIT CLOCK COUNT | FEE PER UNIT MEMORY CAPACITY | FEE PER UNIT DISK BAND | FEE PER UNIT NETWORK BAND | FEE PER UNIT DISK IO FREQUENCY |
| STORED EXAMPLE | Fcr/1 CORE | Fcl/0.1GHz | Fm/0.1GB | Fdb/(10MB/Sec) | Fnb/0.1Gbps | Fdi/10/IOPS |

| ITEMS | CORE | CLOCK | MEMORY | DISK BAND | NETWORK BAND | DISK IO |
|---|---|---|---|---|---|---|
| DESCRIPTION | ASSIGNED CORE COUNT | ASSIGNED CLOCK COUNT | ASSIGNED MEMORY CAPACITY | ASSIGNED DISK BAND | ASSIGNED NETWORK BAND | ASSIGNED DISK IO FREQUENCY |
| STORED EXAMPLE | 1 | 1.5GHz | 4GB | 100MB/Sec | 1.2Gbps | 400/IOPS |

| ITEMS | CORE | CLOCK | MEMORY | DISK BAND | NETWORK BAND | DISK IO |
|---|---|---|---|---|---|---|
| DESCRIPTION | ASSIGNED CORE COUNT | ASSIGNED CLOCK COUNT | ASSIGNED MEMORY CAPACITY | ASSIGNED DISK BAND | ASSIGNED NETWORK BAND | ASSIGNED DISK IO FREQUENCY |
| STORED EXAMPLE | 1 | 1.5GHz | 4GB | 100MB/Sec | 2.0Gbps | 400/IOPS |

| ITEMS | CORE | CLOCK | MEMORY | DISKBAND | NETWORK BAND | DISK IO |
|---|---|---|---|---|---|---|
| DESCRIPTION | LOWER LIMIT CORE COUNT | LOWER LIMIT CLOCK COUNT | LOWER LIMIT MEMORY CAPACITY | LOWER LIMIT DISK BAND | LOWER LIMIT NETWORK BAND | LOWER LIMIT DISK IO FREQUENCY |
| STORED EXAMPLE | 1 | 0.6GHz | 1.6GB | 40MB/Sec | 088Gbps | 160/IOPS |

| ITEMS | CORE | CLOCK | MEMORY | DISKBAND | NETWORK BAND | DISK IO |
|---|---|---|---|---|---|---|
| DESCRIPTION | USE CORE COUNT | USE CLOCK COUNT | USE MEMORY CAPACITY | 使用DISK BAND | USE DISK BAND | USE NETWORK BAND |
| STORED EXAMPLE | 1 | 1.2GHz | 1.2GB | 40MB/Sec | 2.0Gbps | 200/IOPS |

FIG. 11

| ITEMS | TIME | CORE | CLOCK | MEMORY | DISK BAND | NETWORK BAND | DISK IO | PRICE |
|---|---|---|---|---|---|---|---|---|
| DESCRIPTION | TIME | CORE COUNT | CLOCK COUNT | MEMORY CAPACITY | DISK BAND | NETWORK BAND | DISK IO FREQUENCY | FEE |
| STORED EXAMPLE | 20110410 10:00–11:00 | 1 | 1.5GHz | 4GB | 100MB/Sec | 1.2Gbps | 400/IOPS | 2.0 DOLLARS/h |
| | 20110410 11:00–12:00 | 1 | 1.5GHz | 4GB | 100MB/Sec | 1.4Gbps | 400/IOPS | 2.5 DOLLARS/h |
| | 20110410 12:00–13:00 | 1 | 1.5GHz | 4GB | 100MB/Sec | 1.6Gbps | 400/IOPS | 2.7 DOLLARS/h |

REPORT ABOUT USE SPECIFICATION CATEGORY AND USAGE FEE
YOUR SPECIFIED ACCOUNT WILL BE DEBITED ON OCTOBER 10

MAXIMUM FEE SET BY YOU   4.0 DOLLARS PER UNIT TIME   MAXIMUM ALLOWABLE FEE 2,800.00 DOLLARS

DETAILS OF USE

| TIME AND DATE | CPU | MEMORY | DISK | NETWORK | FEE |
|---|---|---|---|---|---|
| 2011/9/1 00:00-2011/9/02 11:59 | 1 CORE (1.5GHz) | 4.0GB | 100MB/SECOND (10,000rpm) | 1.2Gbps | 2.0 DOLLARS |
| 2011/9/2 12:00-2011/9/05 18:59 | 1 CORE (1.5GHz) | 4.0GB | 100MB/SECOND (10,000rpm) | 1.4Gbps | 2.5 DOLLARS |
| 2011/9/5 19:00-2011/9/10 06:59 | 1 CORE (1.5GHz) | 5.0GB | 100MB/SECOND (10,000rpm) | 1.6Gbps | 2.7 DOLLARS |
| ...... | ...... | ...... | | | |

YOUR AVERAGE USAGE FEE PER UNIT TIME 2.55 DOLLERS   TOTAL MONTHLY FEE (QUANTITY BILLED) 1,836.00 DOLLARS

MANAGEMENT SYSTEM, MANAGEMENT APPARATUS, AND MANAGEMENT METHOD

CROSS-REFERENCE TO RELATED APPLICATION

This application is based upon and claims the benefit of priority of the prior Japanese Patent Application No. 2012-20625, filed on Feb. 2, 2012, the entire contents of which are incorporated herein by reference.

FIELD

The embodiments discussed herein relate to managing virtual machines.

BACKGROUND

A service is utilized, by providing hardware and software resources to users via a network. Such a service is generically called a cloud service or specifically called Infrastructure as a Service (IaaS). The cloud service includes providing via the Internet or the like to the user an infrastructure on which a computer system is built or operated. The infrastructure refers to a virtual machine and a network. The cloud service is commercially available in a variety of products including Amazon EC2 (trade name), Amazon S3 (trade name), and Nifty Cloud (trade name), for example.

Cloud service providers (hereinafter simply referred to as providers) construct a virtual machine execution apparatus that executes a virtual machine (VM), and connects the virtual machine to a network, such as the Internet. The provider allows a user of the cloud service to use the virtual machine, and gains fees for use.

The provider provides the user of the cloud service (hereinafter simply referred to as user) with virtual machines with a plurality of specification levels ranging from specification level 1 to specification level 11. The higher the level number is, the higher the specification level is, and the usage fee is higher as the specification level of cloud service is higher.

The user may select a desired level from among the level 1 through the level 11 set by the provider, and make use of a cloud service corresponding to the selected level (in other words, makes a business operation in the cloud).

In order to find an appropriate level matching a business operation, the user measures a response to a business operation at the selected level, and raises the level if the response is insufficient, or lowers the level if the response is sufficient. The user themselves is to find an appropriate level.

Business operations may typically vary depending on time, day of the week, and day of the month. It is very difficult for each user to identify time of peak performance, and determine an optimum level matching the peak performance. The user thus simply selects a level in view of predicted peak performance.

However, if the level is selected in view of the predicted peak performance, a high level is naturally selected. As a result, the usage fee becomes high, incurring overhead. In the currently available cloud services, the usage fee of each level is determined depending on the specifications of a central processing unit (CPU) and a memory assigned to a virtual machine. For example, as the level is high, a clock count of the CPU, a memory capacity of the memory, and a network band are increased. A higher usage fee thus results.

The user may now select an intermediate level or a low level taking cost performance considerations into account. In such a case, disk input and output (IO) and network IO may be a bottleneck (IO neck) in a business operation where a great deal of network IO is executed (to process information). If such a bottleneck occurs, the business operation is slowed down. The user may find the business operation stressful.

In a business operation where almost neither disk IO nor the network IO is performed, there is a possibility that the usage fee is high because more specifications (hardware resources) than those actually used for the business operation are assigned to the virtual machine of the user.

As described above, the user has difficulty in appropriately adjusting a variety of hardware resource quantities assigned to the virtual machine while controlling the usage fee below a fee specified by the user themselves.

The hardware resources of the cloud service are subject to a limitation. It is thus desirable that the provider adjusts the hardware resource quantities to be assigned to a plurality of virtual machines used by a plurality of users.

Japanese Laid-open Patent Publication Nos. 2004-503011 and 2011-076506 exist as prior arts.

SUMMARY

According to an aspect of the invention, a management system comprising a physical machine that controls a virtual machine to execute an information processing by using hardware resources of the physical machine, and a management apparatus managing the physical machine, the management apparatus including a memory configured to store data indicating a first usage fee corresponding to the virtual machine, a first quantity of the hardware resources assigned to the virtual machine in accordance with the first usage fee, and a second quantity of the hardware resources used by the virtual machine, and a processor configured to execute a procedure, the procedure including, detecting the second quantity equal to or larger than a specific quantity set based on a first quantity, during the virtual machine executes the information processing, calculating a second usage fee of the virtual machine based on a third quantity larger than the first quantity, when the second quantity is detected, comparing the calculated second usage fee with the first usage fee, and modifying the first quantity to meet with the third quantity when the calculated second usage fee is equal to or lower than the first usage fee.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of the generation process of a virtual machine.

FIG. 5A illustrates an example of a table used for the generation process of the virtual machine.

FIG. 5B illustrates an example of a table used for the generation process.

FIG. 5C illustrates an example of a table used for the generation process.

FIG. 6 exemplary illustrates a process of canceling a bottleneck.

FIG. 7A exemplary illustrates a table used for a modification process of the hardware resource quantities to be assigned to a virtual machine.

FIG. 7B exemplary illustrates a table used for a modification process of the hardware resource quantities to be assigned to a virtual machine.

FIG. 8A exemplary illustrates a table that indicates a modification process of hardware resource quantities to be assigned to the virtual machine.

FIG. 8B exemplary illustrates a table used for a modification process of hardware resource quantities to be assigned to the virtual machine.

FIG. 10A exemplary illustrates a table used for a modification process of the hardware resource quantities to be assigned to the virtual machine.

FIG. 10B exemplary illustrates a table used for a modification process of the hardware resource quantities to be assigned to the virtual machine.

FIG. 10C exemplary illustrates a table used for a modification process of the hardware resource quantities to be assigned to the virtual machine.

FIG. 11 exemplary illustrates a table that stores the hardware resource quantities assigned to the virtual machine at the present time.

FIG. 12 exemplary illustrates the hardware resource quantities assigned to the virtual machine and a usage fee of the virtual machine by unit time wherein these data are to be transmitted to a user.

DESCRIPTION OF EMBODIMENTS

Configuration of Cloud System

Figure 1:
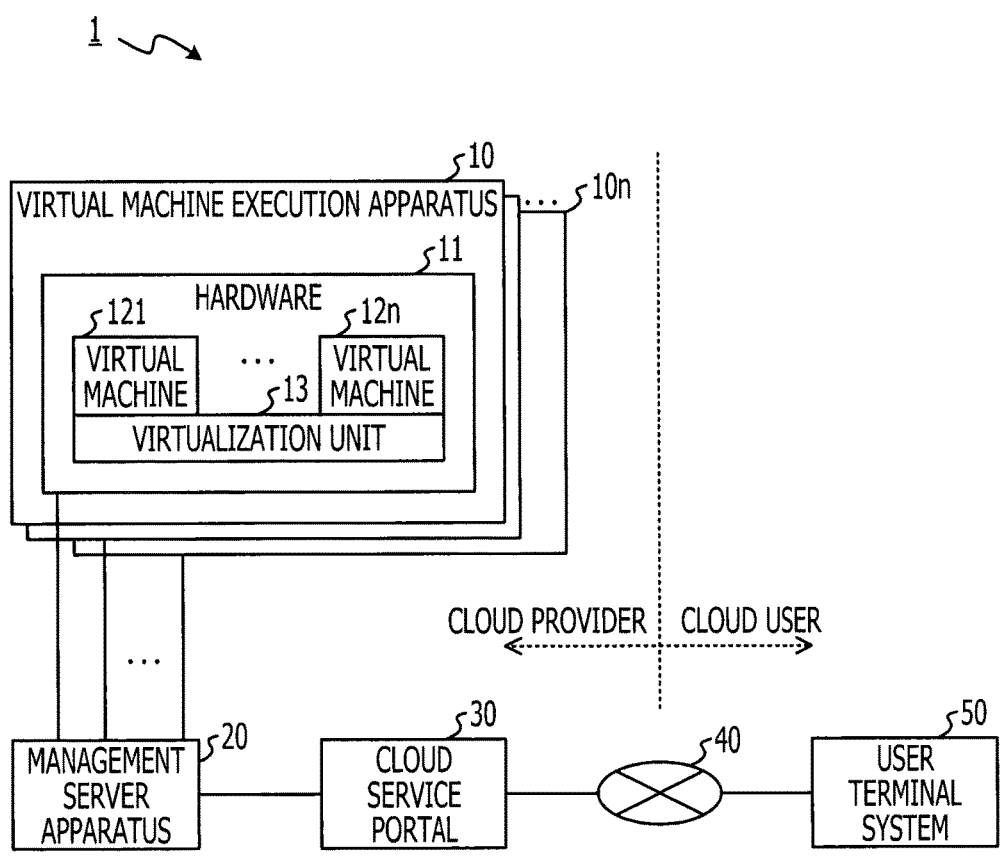
FIG. 1 exemplary illustrates a hardware block diagram of a cloud system of an embodiment.

FIG. 1 exemplary illustrates a hardware block diagram of a cloud system 1 of an embodiment.

The cloud system 1 as an information processing system includes a plurality of virtual machine execution apparatuses 10 through 10$n$ that are physical machines and control virtual machines, a management server apparatus 20 that manages the virtual machine execution apparatuses 10 through 10$n$, and the cloud service portal 30 that performs an interfacing function between the management server apparatus 20 and a network 40. The management server apparatus 20 may not necessarily be a server but simply an apparatus (virtual machine management apparatus) that manages a virtual machine.

The virtual machine execution apparatuses 10 through 10$n$ may be coupled the management server apparatus 20 via a local area network (LAN), and the management server apparatus 20 may also be coupled to the cloud service portal 30 via the LAN.

The virtual machine execution apparatus 10 includes hardware 11 as a physical element.

Virtual machines 121 through 12$n$ implement virtualized hardware, and are initiated by virtualization unit 13 or the management server apparatus 20.

The virtualization unit 13 is a functional block implemented by at least one of the CPU 101 and the CPU 102 that executes virtualization software. The virtualization software is a software infrastructure that virtualizes the hardware 11 as described with reference to FIGS. 5A through 5C, and assigns the virtualized hardware 11 to the virtual machines 121 through 12$n$ to cause the virtual machines 121 through 12$n$ to operate. Commercially available as the virtualization software are VMware ESX (trade name), Microsoft Hyper-V (trade name), and Xen (trade name), for example.

As illustrated in FIG. 1, the cloud system 1 includes the virtual machine execution apparatuses 10 through 10$n$, and the virtual machine execution apparatuses 10 through 10$n$ are managed by the management server apparatus 20.

The management server apparatus 20 is coupled to the virtual machine execution apparatuses 10 through 10$n$ and manages a plurality of virtual machines in conjunction with virtualization software. Commercially available as the management server apparatus 20 are MVware vCenter Server (trade name), and Microsft SCVMM (trade name), for example. The management server apparatus 20 in turn is coupled to the cloud service portal 30.

The cloud service portal 30 is a so-called web server apparatus, and receives an information process request from a user via the network 40 and then transfers the information process request to the management server apparatus 20. The management server apparatus 20 causes a virtual machine of the user to execute the information process request, and obtains process results. The cloud service portal 30 then transmits the obtained results to the cloud service portal 30. The cloud service portal 30 transmits the received results to a user terminal system 50 of the user.

The cloud service portal 30 also performs a receiving interfacing function (entry point) that monitors operational status of the virtual machines 121 through 12$n$, and operates the virtual machines 121 through 12$n$. When the user makes a contract with a provider to receive cloud service, the cloud service portal 30 is used.

The network 40 may be the Internet, or a virtual private network (VPN).

The user terminal system 50 includes a plurality of terminals used by users of the cloud system 1. The user terminal system 50 is coupled to the cloud service portal 30 via the network 40. The user causes a virtual machine (the virtual machine 121, for example) assigned to the user to perform a variety of information processes and acquires process results.

Figure 2:
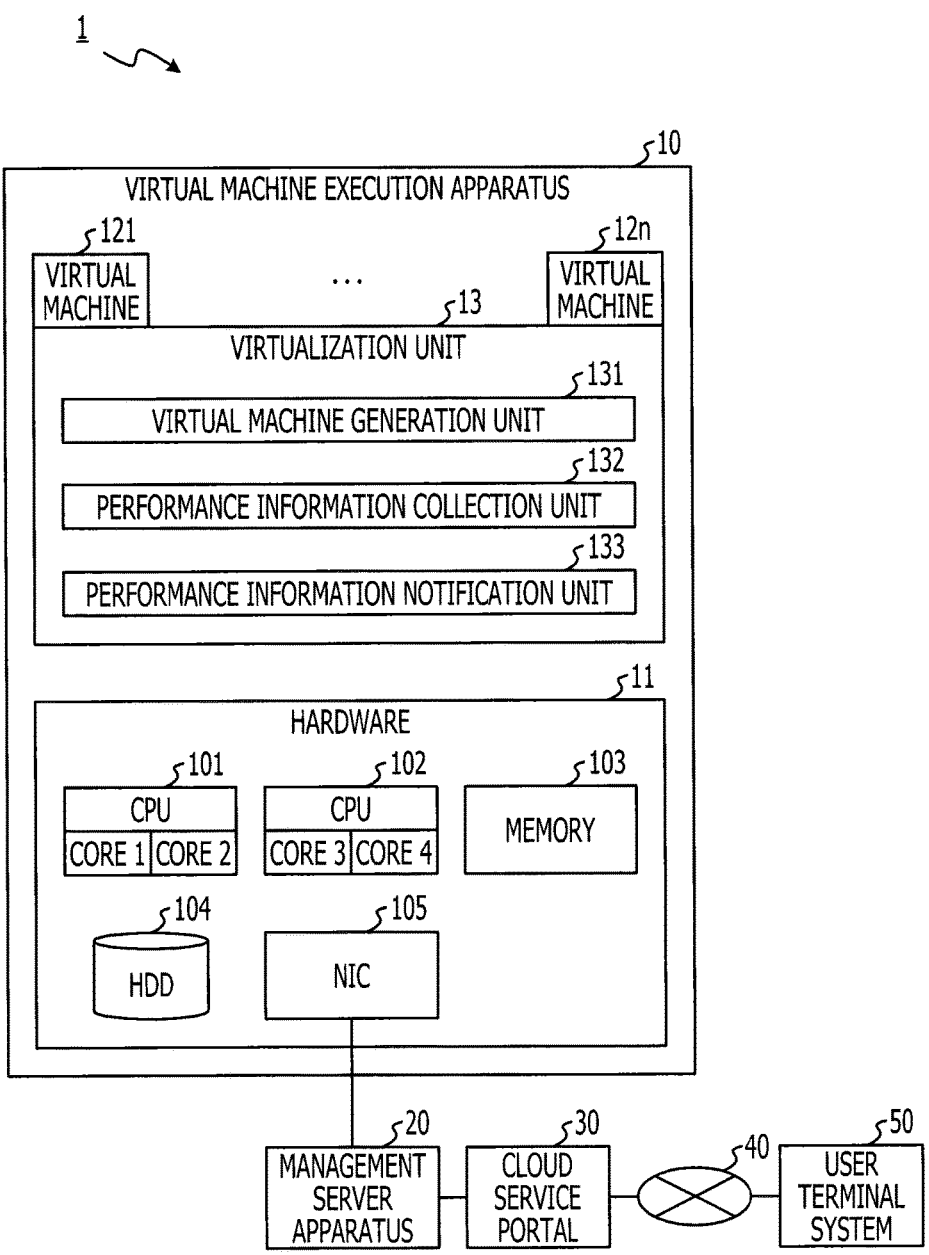
FIG. 2 is a block diagram illustrating an example of virtual machine execution apparatus.

FIG. 2 is a block diagram illustrating an example of the virtual machine execution apparatus 10. The other virtual machine execution apparatuses including the virtual machine execution apparatus 10n are similar with the virtual machine execution apparatus 10 in structure.

FIG. 2 further illustrates an example of hardware that constitutes at least a portion of functional blocks included in the virtual machine execution apparatus 10. The hardware 11 in the virtual machine execution apparatus 10 includes a plurality of central processing units (CPUs) 101 and 102 and a memory 103, coupled to each other via a bus (not illustrated). The hardware 11 further includes a plurality of hard disk drives (HDDs) 104, and a network interface card (NIC) 105. The CPU 101 includes a plurality of cores 1 and 2, and the CPU 102 includes a plurality of cores 3 and 4. The CPU 101 and CPU 102 are referred to as a dual-core processor. The CPU 101 and CPU 102 are examples of processors which read out a program (for example, the virtualization program) stored in the HDD 104 and execute the program. The processor is a hardware to carry out operations based on at least one program (such as the virtualization software) and control other hardware. The processor may be the CPU, a GPU (graphics processing unit), FPU (floating point number processing unit) and DSP (digital signal processor), for example.

Hardware resource quantities refers to performance specifications of hardware resources, and includes the core count of the CPU, the clock count of the CPU, the capacity of the memory, the band of the hard disk drive, and the band of a physical network, for example.

The virtual machine execution apparatus 10 is coupled to the management server apparatus 20 via the NIC 105.

As described above, the virtualization unit 13 is the functional block implemented by at least one of the CPU 101 and the CPU 102 that executes the virtualization software. And, the virtualization unit 13 includes virtual machine generation unit 131, performance information collection unit 132, and performance information notification unit 133. The virtual machine generation unit 131, the performance information collection unit 132, and the performance information notification unit 133 are also functional blocks implemented by at least one of the CPU 101 and the CPU 102 that executes the virtualization software.

The virtual machine generation unit 131 generates a virtual machine at a specific specification in response to an instruction from the management server apparatus 20. The performance information collection unit 132 collects performance information of the virtual machine 121, for example, in response to an instruction from the management server apparatus 20. The performance information notification unit 133 notifies the management server apparatus 20 of the performance information of the virtual machine 121 collected by the performance information collection unit 132. The virtual machine generation unit 131, the performance information collection unit 132, and the performance information notification unit 133 are described in detail below.

Programs serving as the virtual machine generation unit 131, the performance information collection unit 132, and the performance information notification unit 133 are stored on the HDD 104.

When the virtual machine execution apparatus 10 is started up, the CPU 101 loads the programs (for example, the virtualization program) from the HDD 104 onto the memory 103.

Figure 3A:
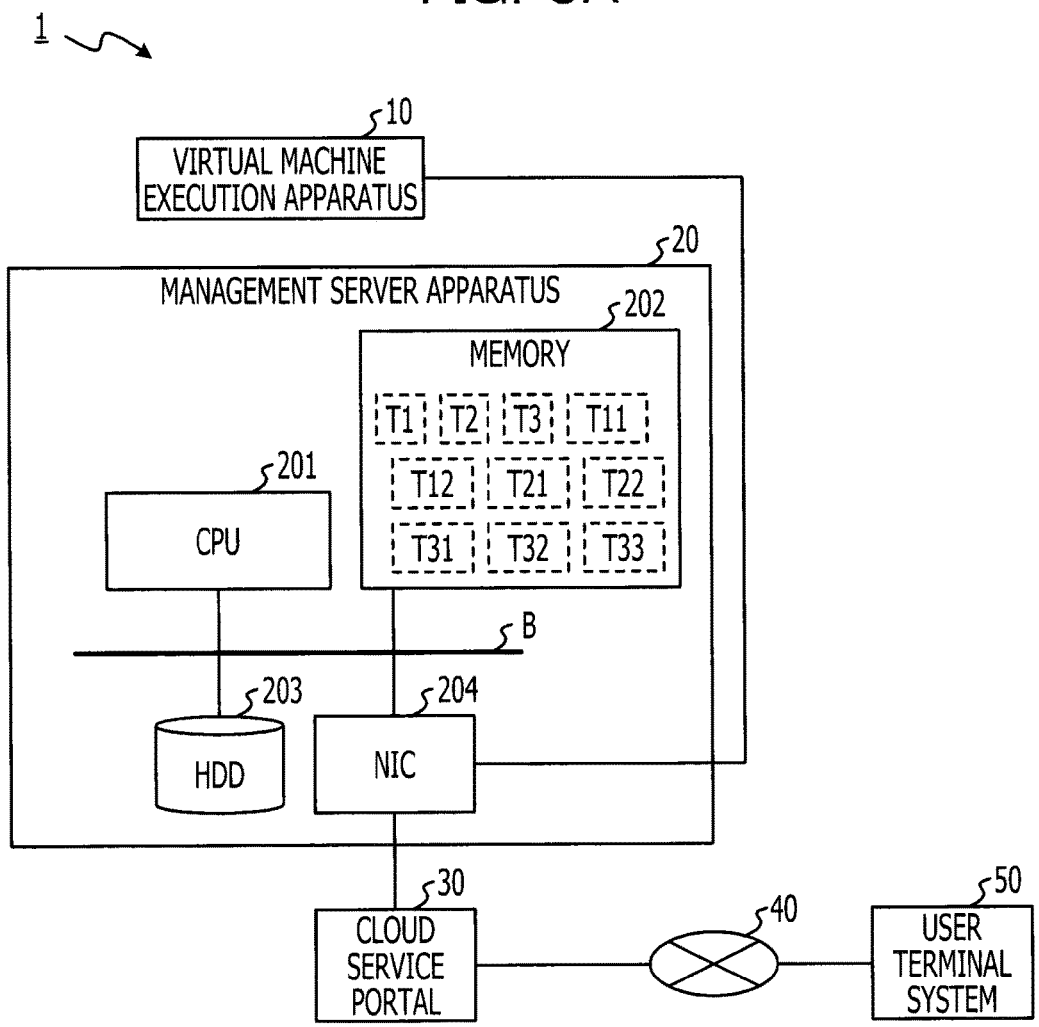
FIG. 3A is a block diagram illustrating an example of management server apparatus.

FIG. 3A is a block diagram illustrating an example of the management server apparatus 20. The management server apparatus 20 includes a CPU (controller) 201, memory 202, HDD 203, and NIC 204, serving as a computer and coupled to each other via bus B. The management server apparatus 20 is coupled to the virtual machine execution apparatus 10, and the cloud service portal 30 via the NIC 204. The memory 202 has regions that store a variety of tables T1, T2, and T3 (see FIGS. 5A through 5C), tables T11 and T12 (see FIGS. 7A and 7B), tables T21 and T22 (see FIGS. 8A and 8B), and tables T31, T32, and T33 (FIGS. 10A through 10C), used in increase and decrease processes of hardware resource quantities. The CPU 201 is an example of a processor which reads out a program (for example, a management program) stored in the HDD 203 and executes the program. The processor is a hardware to carry out operations based on at least one program (such as the management program) and control other hardware. The processor may be the CPU, a GPU (graphics processing unit), FPU (floating point number processing unit) and DSP (digital signal processor), for example.

Figure 3B:
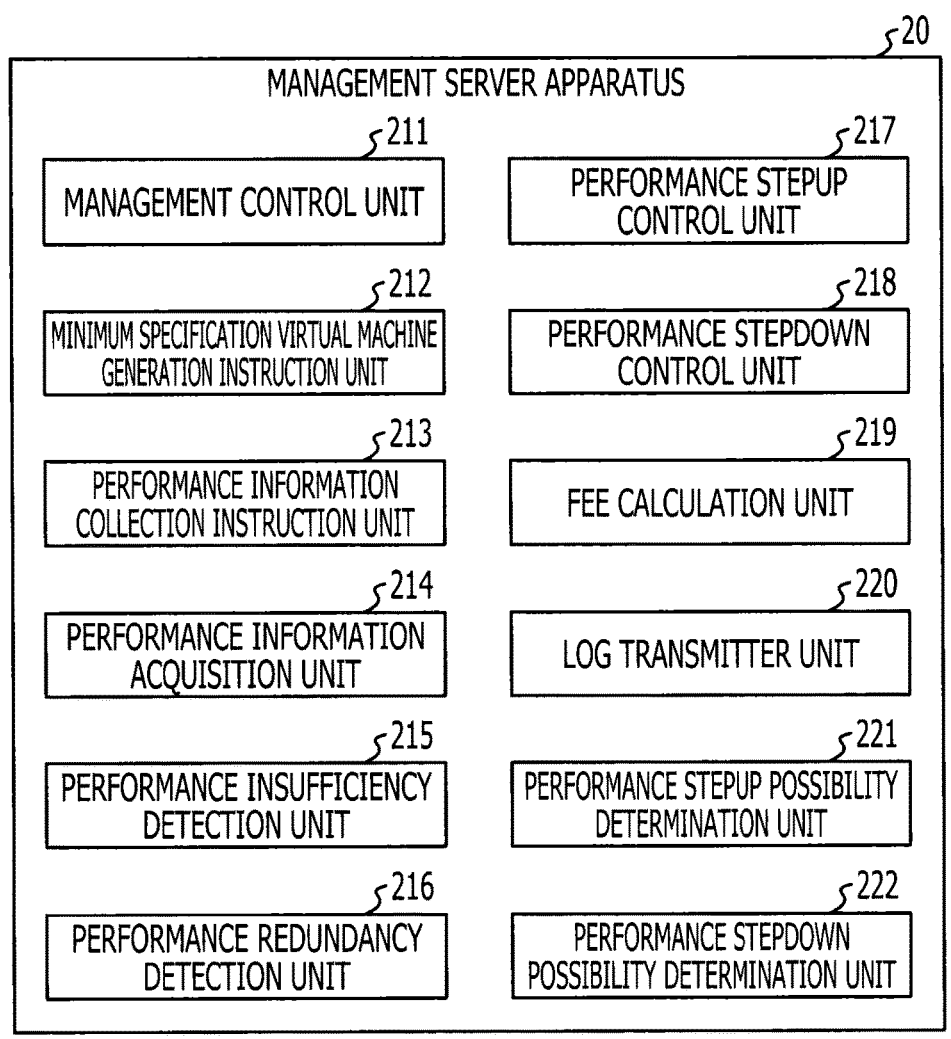
FIG. 3B is a block diagram illustrating an example of a management server apparatus.

FIG. 3B is a block diagram illustrating an example of the management server apparatus 20.

The management server apparatus 20 includes functional blocks (management control unit 211, minimum specification virtual machine generation instruction unit 212, performance information collection instruction unit 213, performance information acquisition unit 214, performance insufficiency detection unit 215, performance redundancy detection unit 216, performance stepup control unit 217, performance stepdown control unit 218, fee calculation unit 219, log transmitter unit 220, performance stepup possibility determination unit 221, and performance stepdown possibility determination unit 222). Each of the functional blocks included in the management server apparatus is implemented by at least the CPU 201 that executes the management program.

The management control unit 211 controls the virtual machine. The minimum specification virtual machine generation instruction unit 212 instructs the virtual machine generation unit 131 (FIG. 2) to generate a virtual machine of minimum specifications. The performance information collection instruction unit 213 instructs the performance information collection unit 132 (FIG. 2) to collect performance information of a virtual machine. The performance information acquisition unit 214 acquires the performance information from the performance information notification unit 133 (FIG. 2).

The performance insufficiency detection unit 215 detects a hardware resource quantity of a hardware resource that becomes a bottleneck of hardware resources used by the virtual machine, and the performance redundancy detection unit 216 detects from among the hardware resources a hardware resource that has performance redundancy.

The performance stepup control unit 217 instructs the virtualization unit 13 to increase the hardware resource quantity assigned to the virtual machine by a specific unit of amount. The performance stepdown control unit 218 instructs the virtualization unit 13 to decrease the hardware resource quantity assigned to the virtual machine by a specific unit of amount.

The fee calculation unit 219 calculates a usage fee of the virtual machine, and the log transmitter unit 220 transmits to the user the logged usage fee of the virtual machine.

The performance stepup possibility determination unit 221 determines whether or not the hardware resource quantity to be assigned to the virtual machine may be increased. The performance stepdown possibility determination unit 222 determines whether or not the hardware resource quantity to be assigned to the virtual machine may be decreased.

The HDD 203 stores programs that function as the management control unit 211, the minimum specification virtual machine generation instruction unit 212, the performance information collection instruction unit 213, the performance information acquisition unit 214, the performance insufficiency detection unit 215, the performance redundancy detection unit 216, the performance stepup control unit 217, the performance stepdown control unit 218, the fee calculation unit 219, the log transmitter unit 220, the performance stepup possibility determination unit 221, and the performance stepdown possibility determination unit 222.

When the management server apparatus 20 is started up, the CPU 201 loads the programs (for example, the management program) from the HDD 203 onto the memory 202.

Generation Process of Virtual Machine

Generation process of the virtual machine performed by the virtualization unit 13 is described with reference to FIG. 4 and FIGS. 5A through 5C.

FIG. 4 illustrates an example of the generation process of the virtual machine.

FIG. 5A illustrates an example of a table used for the generation process of the virtual machine. FIG. 5B illustrates an example of a table used for the generation process of the virtual machine. FIG. 5C illustrates an example of a table used for the generation process of the virtual machine.

The generation process of the virtual machine is discussed with reference to FIG. 4. In the discussion, reference is appropriately made to the block diagram of FIG. 2 of the virtual machine execution apparatus 10, and the block diagram of FIG. 3 of the management server apparatus 20.

In operation (1) of the user terminal system 50 of FIG. 4, the user of the user terminal system 50 operates the user terminal system 50, sets a specific specification fee and issues to the cloud service portal 30 a generation request to generate a virtual machine (as denoted by arrow A1). The specification fee is represented by a usage fee of the virtual machine to be paid by the user per unit time. For example, the user specifies the usage fee of the virtual machine from among a plurality of different usage fees displayed on a menu screen.

The cloud service portal 30 transmits to the management server apparatus 20 the generation instruction of the virtual machine and the usage fee specified by the user (hereinafter simply referred to as specified fee).

The management control unit 211 receives the generation instruction of the virtual machine and the specified fee transmitted from the cloud service portal 30, and stores the specified fee on the memory 202 in the management server apparatus 20.

FIG. 5A illustrates a specified fee table T1 that stores the specified fee of the user. As illustrated in FIG. 5A, 40 dollars per hour is stored as the specified fee (maximum fee). The specified fee table T1 is stored on the memory 202 in the management server apparatus 20 (see FIG. 3). The generation process of the virtual machine is further described with reference to FIG. 4.

In operation (2-1) of the management server apparatus 20 of FIG. 4, the minimum specification virtual machine generation instruction unit 212 in the management server apparatus 20 instructs the virtual machine generation unit 131 in the virtual machine execution apparatus 10 to generates a virtual machine at a specific specification (minimum specification) (as denoted by arrow A2-1). The specific specification refers to a specific hardware resource quantity determined for the specified fee, and may be a minimum hardware resource quantity, for example. As described with reference to FIG. 6, the virtual machine is generated at the minimum hardware resource quantity such that a hardware resource quantity becoming a bottleneck is quickly identified and adjusted to an optimum quantity.

FIG. 5B illustrates an assignment table T2 that stores the hardware resource quantities (minimum hardware resource quantities) assigned to the virtual machine 121 in view of the specified fee. The assignment table T2 is stored on the memory 202 in the management server apparatus 20 (see FIG. 3A).

The assignment table T2 of FIG. 5B stores a minimum hardware resource quantity of each of the core count (core) of the CPU assigned to the virtual machine as a generation target, the clock count (clock) of the CPU, the memory capacity (memory) of the memory, the disk band (diskband) of the HDD, the network band (networkband) of the NIC, and the disk input and output frequency (disk IO) of the HDD. Input and output per second (IOPS) of the disk IO frequency refers to an input and output access count that the HDD may process per second.

It is assumed that the minimum hardware resource quantity is pre-set by the provider.

In operation (2-2) of the virtualization unit 13 of FIG. 4, the virtual machine generation unit 131 in the virtualization unit 13 generates a virtual machine at the minimum hardware resource indicated in the assignment table T2. The virtual machine generated by the virtual machine generation unit 131 operates within the range of each minimum hardware resource quantity.

In the example of the table T2 of FIG. 5B, the virtual machine generation unit 131 assigns to a single virtual machine a CPU count of 1, a clock count of 1.5 GHz, a memory capacity of 4 GB, a disk band of the HDD of 100 MB/s, a network band of 1 Gbps, and a disk IO frequency of 400/IOPS, and generates the virtual machine. The virtual machine generated by the virtual machine generation unit 131 is referred to as the virtual machine 121.

The virtualization unit 13 distributes the hardware resource quantities to the virtual machine 121 within the range of assigned hardware resource quantities, and the virtual machine 121 executes a variety of information processes using the distributed hardware resource quantities. The hardware resource quantities assigned to the virtual machine 121 are referred to as assigned hardware resource quantities as appropriate.

The virtual machine generation unit 131 in the virtual machine execution apparatus 10 assigns core 1 of the CPU 101 and a clock count of 1.5 GHz of the CPU 101 to the virtual machine 121. The clock count of 1.5 GHz assigned to the virtual machine 121 means that, given a maximum clock count of 3.0 GHz of the CPU 101, the virtual machine 121 may exclusively use the CPU 101 for a time-divided 0.5 second of the second (1.5/3.0).

The virtual machine generation unit 131 in the virtual machine execution apparatus 10 assigns a memory capacity of 4.0 GB of the memory 103 to the virtual machine 121, assigns a disk band of 100 MB/s of the HDD 104 to the virtual machine 121, and assigns a network band of 1 Gbps of the NIC 105 to the virtual machine 121. The memory capacity of 4.0 GB assigned to the virtual machine 121 means that, given a maximum memory capacity of 8 GB of the memory 103, the virtual machine 121 may exclusively use a memory capacity of 4 GB of the memory 103.

The disk band of 100 MB/s assigned to the virtual machine 121 means that, given a maximum disk band of the HDD 104 of 200 MB/s, the virtual machine 121 is permitted to use the HDD 104 exclusively for a time-divided 0.5 second (100/200). The network band of 1 Gbps assigned to the virtual machine 121 means that, given a maximum network band of the NIC 105 of 2 Gbps, the virtual machine 121 is permitted to use the NIC 105 exclusively during a time-divided 0.5 second (½) of the second.

The disk drive IO frequency of the HDD 104 of 400/IOPS assigned to the virtual machine 121 means that, given a maximum disk band 800/IOPS of the HDD 104, the virtual machine 121 is permitted to perform 400 IO operations per second. The band of the hard disk drive and the disk drive IO frequency are specifications of a single hard disk drive.

As previously discussed, the virtualization unit 13 manages the virtual machine 121. More specifically, in the course of the information process of the virtual machine 121, the virtualization unit 13 continuously adjusts the hardware resource quantity actually used by the virtual machine 121. The virtualization unit 13 may thus detect the hardware resource quantity actually used by the virtual machine 121. The hardware resource quantity actually used by the virtual machine 121 is referred to as a use hardware resource quantity as appropriate.

FIG. 5C illustrates a use resource quantity table T3 that stores the use hardware resource quantities.

As illustrated in FIG. 5C, the virtualization unit 13 manages, in a table format, a CPU core count (use core count) as the use hardware resource quantity, a CPU clock count (use clock count), a disk capacity (use disk capacity), a network band (use network band), and a disk IO frequency (use disk IO frequency).

As previously described, a hardware resource becoming a bottleneck may be created in the course of the execution of the information process of the virtual machine. For example, the virtual machine 121 may execute an information process that involves a communication operation of a large amount of data via an external server apparatus and the NIC 105 (network). In such a case, the network band pre-assigned to the virtual machine alone is not enough to ensure a sufficient amount of data communication. As a result, data communication traffic per unit time decreases, and the information process is slowed. It is thus desirable that the network band of the NIC 105 to be assigned to the virtual machine 121 is to be increased (is to be stepped up). An increase in the data communication traffic per unit time results, and the bottleneck is cleared. A user thus enjoys smooth operations.

The hardware resource quantities to be assigned to the virtual machine 121 may be adjusted by the virtualization unit 13 as appropriate. In the information process of the virtual machine 121, the management server apparatus 20 identifies a hardware resource quantity becoming a bottleneck, increases the hardware resource quantity of the hardware resource becoming the bottleneck within a range of a usage fee specified by the user, and assigns the increased hardware resource quantity to the virtual machine 121.

A process of clearing a bottleneck is described below. In the process, the hardware resource quantities of a variety of hardware resources assigned to the virtual machine 121 are appropriately adjusted in a variety of information processes of the virtual machine 121.

To clear a bottleneck, the management server apparatus 20 acquires performance information of the virtual machine 121 from the virtualization software 13.

In operation (3-1) of the management server apparatus 20 of FIG. 4, the performance information collection instruction unit 213 in the management server apparatus 20 instructs the performance information collection unit 132 in the virtualization unit 13 to acquire the performance information of the virtual machine 121 at regular intervals when the virtual machine 121 performs the variety of information processes (arrow A3-1).

The regular intervals are every 10 minutes, for example. The performance information of the virtual machine 121 refers to the hardware resource quantity actually used by the virtual machine 121.

In operation (3-2) of the virtualization unit 13 of FIG. 4, the performance information collection unit 132 collects the hardware resource quantity actually used by the virtual machine 121 from the use resource quantity table T3 of FIG. 5C. The performance information collection unit 132 may collect the hardware resource quantity actually used by the virtual machine 121 because the virtualization unit 13 continuously monitors the hardware resource quantity used by the virtual machine 121 as previously described with reference to FIG. 5C.

The performance information collection unit 132 outputs the collected hardware resource quantity to the performance information notification unit 133.

In operation (3-3) of the virtualization unit 13 of FIG. 4, the performance information notification unit 133 notifies the performance information acquisition unit 214 of the performance information of the virtual machine 121 (the use hardware resource quantity) (arrow A3-3).

More specifically, the performance information collection unit 132 outputs the use resource quantity table T3 of FIG. 5C to the performance information notification unit 133. The performance information notification unit 133 transmits the use resource quantity table T3 of FIG. 5C to the performance information acquisition unit 214 in the management server apparatus 20.

In operation (3-4) of the management server apparatus 20 of FIG. 4, the performance information acquisition unit 214 acquires (receives) the transmitted performance information, i.e., the hardware resource quantities used by the virtual machine 121. More specifically, the performance information acquisition unit 214 receives the use resource quantity table T3 of FIG. 5C, and stores the received use resource quantity table T3 on the memory 202 (FIG. 3A).

Process of Clearing Bottleneck

FIG. 6 exemplary illustrates a process of canceling a bottleneck.

In operation (4-1) of the management server apparatus 20 of FIG. 6, the management server apparatus 20 evaluates a performance value of the virtual machine 121 at the regular intervals. The performance value of the virtual machine 121 refers to each hardware resource quantity used by the virtual machine 121. More specifically, the performance insufficiency detection unit 215 in the management server apparatus 20 detects the hardware resource quantity of a hardware resource that becomes a bottleneck among the hardware resources used by the virtual machine 121. The performance redundancy detection unit 216 detects a hardware resource having a performance redundancy from among the hardware resources used by the virtual machine 121.

In operation (4-2) of the management server apparatus 20 of FIG. 6, a hardware resource becoming a bottleneck may be present, and even if the hardware resource quantity of the hardware resource is increased, a usage fee of the virtual machine 121 may still be within a specified fee. If this condition is satisfied, the performance stepup control unit 217 instructs the virtualization unit 13 to increase the hardware resource quantity of the hardware resource that becomes the bottleneck (arrow A4-2).

In operation (4-3) of the virtualization unit 13 of FIG. 6, the virtualization unit 13 responds to an increase instruction by increasing the hardware resource quantity of the hardware resource as the bottleneck by a specific unit of amount (arrow A4-3).

Figure 9A:
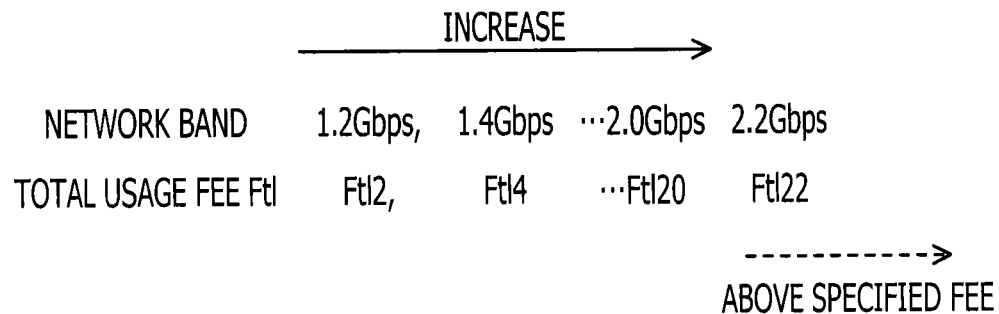
FIG. 9A exemplary illustrates a fee calculation process.

As illustrated in detail in FIG. 9A, the usage fee of the virtual machine exceeds the specified fee if the hardware resource quantity is increased successively. The management control unit 211 thus performs a process described below.

In operation (4-4) of the management server apparatus 20 of FIG. 6, the management control unit 211 then determines whether the usage fee of the virtual machine 121 is equal to or lower than the specified fee if the management control unit 211 decreases the hardware resource quantity of a hardware resource having a performance redundancy by a specific unit of amount, and increases the hardware resource quantity of a hardware resource becoming a bottleneck by the specific unit of amount. If the usage fee of the virtual machine 121 is equal to or lower than the specified fee, the performance stepdown control unit 218 instructs the virtualization unit 13 to decrease the hardware resource quantity of the hardware resource having the performance redundancy by the specific unit of amount. The performance stepup control unit 217 instructs the virtualization unit 13 to increase the hardware resource quantity of the hardware resource becoming the bottleneck by the specific unit of amount (arrow A4-4).

In operation (4-5) of the virtualization unit 13 of FIG. 6, the virtualization unit 13 decreases the hardware resource quantity in performance redundancy by the specific unit of amount in response to a decrease instruction. The virtualization unit 13 increases the hardware resource quantity becoming the bottleneck by the specific unit of amount in response to an increase instruction (arrow A4-5).

In operation (5-1) of the management server apparatus 20 of FIG. 6, the management server apparatus 20 logs the performance value of the virtual machine 121 at the regular intervals (every 10 minutes, for example).

In operation (5-2) of the management server apparatus 20 of FIG. 6, the management server apparatus 20 reports to the user via e-mail or the like the hardware resource quantities assigned to the virtual machine 121, the usage fee of the virtual machine 121 by a unit of time, and the monthly usage fee of the virtual machine 121 (arrow A5-2). The user is thus kept informed of the use status of the virtual machine 121.

Described next is operation of the virtual machine execution apparatus 10 and the management server apparatus 20 in the information process of the virtual machine 121 discussed with reference to FIG. 4.

Increase Process of Hardware Resource Quantity Becoming Bottleneck

An increase process of the hardware resource quantity becoming a bottleneck is described below with reference to FIGS. 7A through 9B.

FIG. 7A through 8B exemplary illustrates a table used for a modification process of the hardware resource quantities to be assigned to a virtual machine. FIG. 7A illustrates an example of an upper limit resource quantity storage table T11 that stores the hardware resource quantities determined in accordance with the assignment table T2 of FIG. 5B. FIG. 7B illustrates a specific unit table T12 that stores specific units of the hardware resource quantities.

FIG. 8A illustrates a usage fee table T21 that stores a usage fee of each hardware resource quantity per specific unit of amount. FIG. 8B illustrates an assignment table T22 subsequent to the increase of the hardware resource quantity. These tables T11, T12, T21, and T22 are stored on the memory 202.

Figure 9B:
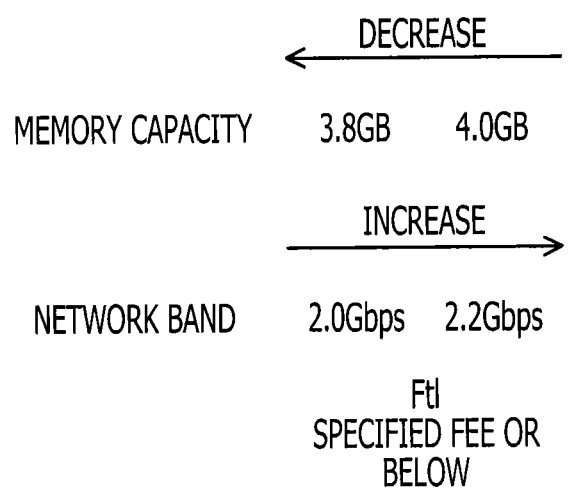
FIG. 9B exemplary illustrates a fee calculation process.

FIG. 9A illustrates the hardware resource quantity that has been increased by a specific unit of amount. FIG. 9B illustrates the hardware resource quantity that has been decreased by a specific unit of amount.

In the course of the information process of the virtual machine 121, the performance insufficiency detection unit 215 detects a hardware resource quantity (a first hardware resource quantity) becoming a bottleneck equal to or larger than a hardware resource quantity determined in accordance with each hardware resource quantity in the assignment table T2, from among the hardware resource quantities used by the virtual machine 121.

The performance insufficiency detection unit 215 here detects as the hardware resource quantity becoming the bottleneck a hardware resource quantity equal to or larger than the hardware resource quantity in the upper limit resource quantity storage table T11 from among the hardware resource quantities used by the virtual machine 121.

In other words, the hardware resource quantity becoming the bottleneck is a hardware resource quantity equal to or larger than an upper limit hardware resource quantity, from among the use hardware resource quantities. For example, the upper limit refers to 80 percent of the hardware resource quantity determined for the hardware resource assigned to the virtual machine 121.

In the upper limit resource quantity storage table T11 of FIG. 7A, the upper limit hardware resource quantities are 80 percent of the respective hardware resource quantities listed in the table T2 of FIG. 5B and assigned to the virtual machine 121. The core count of the CPU is an integer, and 80 percent of the core count assigned to the virtual machine 121 is rounded to the nearest integer.

In FIG. 7A, the upper limit resource quantity storage table T11 stores an upper limit core count 1 (1×0.8) resulting from rounding 0.8 to 1, an upper limit clock count 1.2 GHz (1.5×0.8), an upper limit memory capacity 3.2 GB (4.0×0.8), an upper limit disk band 80 MB/s (100×0.8), an upper limit network band 0.8 Gbps (1×0.8), and an upper limit disk IO frequency 320/IOPS (400×0.8).

The comparison of the use resource quantity table T3 of FIG. 5C storing the use hardware resource quantity with the upper limit resource quantity storage table T11 of FIG. 7A reveals that a hardware resource quantity becoming a bottleneck is the network band (networkband).

The performance insufficiency detection unit 215 thus detects from among the hardware resource quantities used by the virtual machine 121 a hardware resource quantity equal to or larger than the upper limit hardware resource quantity, i.e., a hardware resource quantity becoming a bottleneck. The management control unit 211 stores on the memory 202 information to that effect that the hardware resource quantity becoming the bottleneck is to be increased by a specific unit (one notch). FIG. 7B illustrates the specific unit table T12 that stores a specific unit of each hardware resource quantity.

In the above example, the management control unit 211 stores on the memory 202 information that the hardware resource quantity becoming the bottleneck is to be increased by the specific unit (one notch). The specific unit of the network band is 0.2 Gbps in the specific unit table T12 of FIG. 7B that lists the specific unit of each hardware resource quantity. As a result, the management control unit 211 stores the information that the network band is to be increased (modified) to 1.2 Gbps (1.0+0.2).

The fee calculation unit 219 calculates the usage fee if the hardware resource quantity becoming the bottleneck has thus been modified (increased). The calculation is based on the assignment table T2 of FIG. 5B that stores the hardware resource quantities assigned to the virtual machine 121, a hardware resource quantity corresponding to an increase of a specific unit, and a unit fee of a specific unit hardware resource quantity stored in the usage fee table T21 of FIG. 8A.

In FIG. 8A, label Fcr denotes a unit core fee, i.e., a core fee per unit CPU core, and label Fcl represents a unit clock fee, i.e., a CPU fee per 0.1 GHz. Label Fm denotes a unit memory fee, i.e., a memory fee per 0.1 GB of the memory, and label Fdb denotes a unit disk band fee, i.e., a disk band fee per 10 MB/s of the HDD. Label Fnb denotes a unit network band fee, i.e., a network band fee per 0.1 Gbps of the NIC, and label Fdi denotes a unit disk IO frequency fee, i.e., a disk IO frequency fee per 10 IOPS of the HDD.

More specifically, the fee calculation unit 219 calculates a fee of each hardware resource quantity assigned to the virtual machine 121 stored in the assignment table T2 of FIG. 5B. The calculated fee is referred to as a pre-modification fee Fbfr.

More specifically, the fee calculation unit 219 divides each hardware resource quantity assigned to the virtual machine 121 by the specific unit hardware resource quantity corresponding to the hardware resource quantity in the usage fee table T21 of FIG. 8A, and multiplies the resulting quotient by the unit fee of the hardware resource quantity.

In FIG. 5B, the pre-modification fee Fbfr is CPU core count fee (1(1/1)×unit core fee Fcr)+clock count fee (15 (1.5/0.1)×unit clock count fee Fcl)+memory capacity fee (40(4/0.1)×unit memory fee Fm)+disk band fee (10(100/10)×unit disk band fee Fdb)+network band fee (10(1/0.1)×unit network band fee Fnb)+disk IO frequency fee (40(400/10)×unit disk IO frequency fee Fdi).

Fee of the hardware resource quantity corresponding to a specific unit increment is then calculated. The fee is referred to as a modification added fee Fadd. In the above example, the network band is increased by 0.2 Gbps, and the modification added fee Fadd is 2(0.2/0.1)×Fnb.

The pre-modification fee Fbfr and the modification added fee Fadd are then summed. The total value is a total usage fee Ftl as a result of increasing the hardware resource quantity by the specific unit.

The total usage fee Ftl is calculated in accordance with expression (1).

$$\text{Total usage fee } Ftl = \text{pre-modification fee } Fbfr + \text{modification added fee } Fadd \qquad (1)$$

The management control unit 211 compares the total usage fee Ftl after the modification of the hardware resource quantity with the fee specified by the user to determine whether the total usage fee Ftl is equal to or lower than the specified fee. If the total usage fee Ftl after the modification of the hardware resource quantity is equal to or lower than the fee specified by the user, the performance stepup control unit 217 instructs the virtualization unit 13 to increase the hardware resource quantity as a bottleneck, e.g., increase the hardware resource quantity as the bottleneck by a specific unit.

In response to the increase instruction, the virtualization unit 13 increases the hardware resource quantity becoming the bottleneck by the specific unit of amount.

In the above example, the performance stepup control unit 217 instructs the virtualization unit 13 to increase the network band to 1.2 (1.0+0.2) Gbps. In response to the increase instruction, the virtualization unit 13 increases the network band to be assigned to the virtual machine 121 to 1.2 Gbps.

The management control unit 211 further updates the assignment table T2 of FIG. 5B that stores the assigned hardware resource quantities. In the above example, the management control unit 211 updates the network band from 1 Gbps to 1.2 Gbps. FIG. 8B illustrates a table T22 that stores the updated hardware resource quantities. In this way, the bottleneck is cleared. As a result, the user may enjoy cloud service smoothly.

The cloud system 1 shifts into in a waiting state subsequent to the updating and remains in the waiting state until the regular time interval has elapsed.

Tata communication traffic may increase when the virtual machine 121 executes a transfer process of image data. To clear a bottleneck in the network, the network band to be assigned to the virtual machine 121 may be successively increased to 1.2 Gbps, to 1.4 Gbps, . . . , to 2.0 Gbps as illustrated in FIG. 9A. As a result, the total usage fee Ftl of the virtual machine 121 also increases successively to total usage fee Ftl2, to Ftl4, . . . , to Ftl20. If the network band is increased to 2.2 Gbps, the total usage fee Ftl becomes the total usage fee Ftl22. The total usage fee Ftl22 is above the fee specified by the user. In such a case, the management control unit 211 determines that the fee resulting from increasing the assigned hardware resource quantity by the specific unit is above the fee specified by the user. It is difficult to increase the assigned hardware resource quantity no longer.

The following discussion is based on the premise that a network band of 2.0 Gbps is assigned to the virtual machine 121, and that the management control unit 211 has stored on the memory 202 information that the network band of 2.0 Gbps is to be increased by the specific unit (0.2 Gbps).

Decrease Process of Hardware Resource Quantity

A process of restricting the usage fee of the virtual machine 121 into the specified fee is described below with reference to FIGS. 9A and 9B, and 10A through 10C. In the process, a hardware resource quantity becoming a bottleneck is increased, and a hardware resource quantity in performance redundancy is decreased.

FIG. 10A through 10C exemplary illustrates a table used for a modification process of the hardware resource quantities to be assigned to the virtual machine. FIG. 10A illustrates an assignment table T31 subsequent to the increasing of the hardware resource quantity. FIG. 10B illustrates a lower limit resource quantity table T32 that stores hardware resource quantities that are determined in response to the assignment table T31 of FIG. 10A. FIG. 10C illustrates a use resource quantity table T33 that stores use hardware resource quantities.

The tables T31, T32, and T33 are stored on the memory 202.

If the hardware resource quantity becoming the bottleneck is increased, the total usage fee Ftl of the virtual machine 121 may exceed the specified fee. The performance redundancy detection unit 216 detects a second hardware resource quantity. The second hardware resource quantity is a hardware resource quantity in performance redundancy equal to or smaller than a redundancy hardware resource quantity determined in response to the hardware resource quantity in the assignment table T31 from among the hardware resource quantities used by the virtual machine 121.

The performance redundancy detection unit 216 thus detects as a hardware resource quantity in performance redundancy a hardware resource quantity equal to or smaller than the hardware resource quantity in the lower limit resource quantity table T32 from among the hardware resource quantities used by the virtual machine 121.

In other words, the hardware resource quantity in performance redundancy is the hardware resource quantity equal to or smaller than a lower limit value from among the use hardware resource quantities. The lower limit value refers to 40 percent of the hardware resource quantity assigned to the virtual machine 121.

The assignment table T31 of FIG. 10A stores the hardware resource quantities assigned to the virtual machine 121 at the current point of time.

The lower limit resource quantity table T32 of FIG. 10B stores as the lower limit hardware resource quantities 40 percent of the hardware resource quantities assigned the virtual machine 121 and stored in the assignment table T31 of FIG. 10A. The CPU core count is an integer, and 40 percent of the core count assigned to the virtual machine 121 is rounded to the nearest integer, and 1 is added to the resulting integer.

The lower limit resource quantity table T32 of FIG. 10B stores a lower limit core count 1 resulting from rounding product 0.4 (1×0.4) to 0 and adding 1 to the rounding result, a lower limit clock count 0.6 GHz (1.5×0.4), a lower limit memory capacity 1.6 GB (4.0×0.4), a lower limit disk band 40 MB/s (100×0.4), a lower limit network band 0.8 Gbps (2×0.4), and a lower limit disk IO frequency 160/IOPS (400×0.4).

With reference to the use resource quantity table T33 of FIG. 10C, the performance information acquisition unit 214 may have acquired the hardware resource quantity used by the virtual machine 121 acquired from the virtualization software 13.

The comparison of the use resource quantity table T33 of FIG. 10C storing the use hardware resource quantities with the lower limit resource quantity storage table T32 of FIG. 10B storing the lower limit hardware resource quantities reveals that the use hardware resource quantity equal to or smaller than the lower limit hardware resource quantity is the hardware resource quantity of the memory (i.e., the memory capacity).

The performance redundancy detection unit 216 thus detects the hardware resource quantity in performance redundancy.

The management control unit 211 stores on the memory 202 information that the hardware resource quantity of a hardware resource, having a use hardware resource quantity equal to or smaller than the lower limit hardware resource quantity and assigned to the virtual machine 121, is to be decreased by a specific unit.

In the above example, the management control unit 211 stores on the memory 202 information that the memory capacity to be assigned to the virtual machine 121 is to be decreased by the specific unit. The specific unit of the memory is 0.2 GB in FIG. 7B.

The management control unit 211 thus stores on the memory 202 information that the memory to be assigned to the virtual machine 121 is to be decreased (modified) to 3.8 (4-0.2) GB.

The fee calculation unit 219 calculates the final fee accounting for the fee caused by increasing the hardware resource quantity becoming the bottleneck and the fee for the modification (the increase or decrease) of the hardware resource quantity.

More specifically, the fee calculation unit 219 calculates the total usage fee Ftl with the use hardware resource quantities increased and decreased. In the above example as illustrated in FIG. 9B, the memory capacity to be assigned to the virtual machine 121 is decreased from 4.0 GB to 3.8 GB, and the network band to be assigned to the virtual machine 121 is increased from 2.0 Gbps to 2.2 Gbps, and the total usage fee Ftl is calculated.

The fee calculation process is described in detail. The fee calculation unit 219 calculates the fee of each hardware resource quantity assigned to the virtual machine 121 and stored in the assignment table T31 of FIG. 10A, i.e., calculates the pre-modification fee Fbfr.

The fee calculation unit 219 then calculates the fee of the assigned hardware resource quantity corresponding to a decrease of the specific unit. The resulting fee is set to be a modification decreased fee Fdec. Since the memory capacity is decreased by 0.2 GB in the example of FIG. 9B, the modification decreased fee Fdec is 2(0.2/0.1)×Fm.

The fee calculation unit 219 calculates the fee of the assigned hardware resource quantity of the increase of the specific unit (the modification added fee Fadd). Since the network band is increased by 0.2 Gbps in the example of FIG. 9B, the modification added fee Fadd is 2 (0.2/0.1×Fnb).

The fee calculation unit 219 subtracts from the modification decreased fee Fdec the sum of the pre-modification fee Fbfr and the modification added fee Fadd (2(0.2/0.1)× Fnb).

The fee resulting from the subtraction operation is the total usage fee Ftl that is obtained by accounting for the increase and decrease of hardware resource quantities to be assigned to the virtual machine 121. The total usage fee Ftl is calculated in accordance with expression (2):

Total usage fee $Ftl$=pre-modification fee $Fbfr$+modification added fee $Fadd$−modification decreased fee $Fdec$ (2)

The management control unit 211 compares the total usage fee Ftl subsequent to the modification of the hardware resource quantities to be assigned to the virtual machine 121 with the fee specified by the user. The total usage fee Ftl is the sum of usage fees when the hardware resource quantity becoming the bottleneck is increased and the hardware resource quantity in performance redundancy is decreased.

The management control unit 211 determines whether the total usage fee Ftl is equal to or lower than the fee specified by the user.

If the total usage fee Ftl subsequent to the modification of the hardware resource quantities is equal to or lower than the fee specified by the user, the performance stepup control unit 217 instructs the virtualization unit 13 to increase the hardware resource quantity becoming the bottleneck, by the specific unit. Furthermore, the performance stepdown control unit 218 instructs the virtualization unit 13 to decrease the hardware resource quantity in performance redundancy, by the specific unit.

In the above example, the hardware resource quantity becoming the bottleneck is the network band, and is thus increased by 0.2 Gbps. The hardware resource quantity in performance redundancy is the memory capacity, and is decreased by 0.2 GB.

As previously described with operation (4-5) of FIG. 6, the virtualization unit 13 increases the assigned hardware resource quantity becoming the bottleneck by the specific unit in response to the increase instruction. In the above example, the virtualization unit 13 increases the network band to 2.2 Gbps.

The virtualization unit 13 decreases the hardware resource quantity in performance redundancy by the specific unit in response to the decrease instruction. In the above example, the virtualization unit 13 decreases the memory capacity to 3.8 GB.

The bottleneck is thus cleared by adjusting the hardware resource quantities to be assigned to the virtual machine 121. If an increase in the hardware resource quantity to be assigned to the virtual machine 121 causes the usage fee of the virtual machine 121 to exceed the fee specified by the user, the hardware resource quantity in performance redundancy is decreased to reduce the usage fee of the virtual machine 121. As a result, the hardware resource quantity becoming the bottleneck is increased, clearing the bottleneck.

As described with reference to operation (5-1) of FIG. 6, the management server apparatus 20 logs the performance value of the virtual machine 121 at the regular intervals (every 10 minutes, for example).

FIG. 11 exemplary illustrates a table that stores the hardware resource quantities assigned to the virtual machine at the present time. FIG. 11 is a table T41 that stores the present time, contents of the hardware resource quantities assigned to the virtual machine 121, and the usage fee of the virtual machine 121.

More specifically, the management control unit 211 stores the table T41 illustrated in FIG. 11 on the memory 202. The table T41 stores the present time, the contents of the hardware resource quantities assigned to the virtual machine 121, and the usage fee of the virtual machine 121.

As previously described with reference to operation (5-2) of FIG. 6, the log transmitter unit 220 in the management server apparatus 20 notifies the user of the hardware resource quantities assigned to the virtual machine 121 via e-mail, for example, as illustrated in FIG. 12. FIG. 12 exemplary illustrates the hardware resource quantities assigned to the virtual machine and a usage fee of the virtual machine by unit time wherein these data are to be transmitted to a user.

Routine of Generation Process of Virtual Machine

Figure 13:
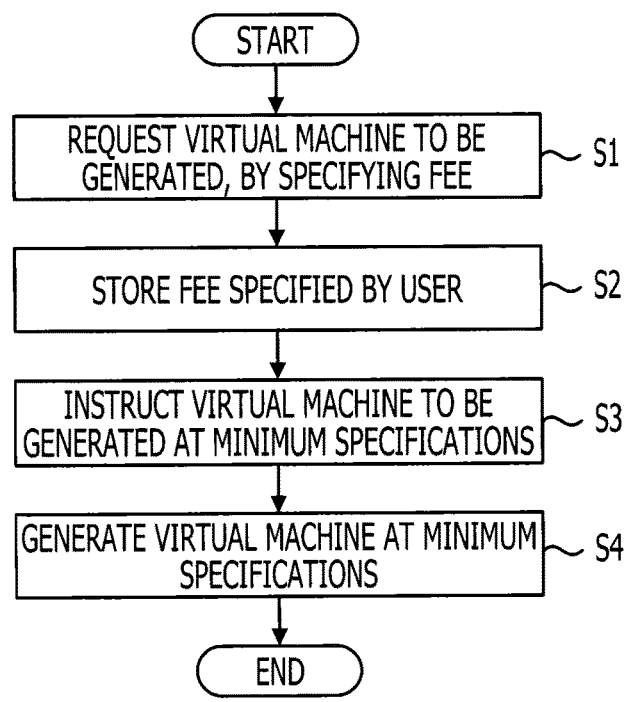
FIG. 13 is an example of a flowchart illustrating a routine of a generation process of the virtual machine of FIG. 4.

FIG. 13 is an example of a flowchart illustrating a routine of the generation process of the virtual machine described with reference to FIG. 4.

In S1, the user operates the user terminal system 50 to specify a (specific) fee, and sends to the cloud service portal 30 a generation instruction of a virtual machine.

In S2, the management control unit 211 in the management server apparatus 20 receives the generation instruction of the virtual machine and the specified fee transmitted from the cloud service portal 30, and stores the specified fee on the memory 202 in the management server apparatus 20.

In S3, the minimum specification virtual machine generation instruction unit 212 in the management server apparatus 20 instructs the virtual machine generation unit 131 in the virtual machine execution apparatus 10 to generate the virtual machine at a specific specification.

In S4, the virtual machine generation unit 131 generates the virtual machine at a minimum specification (at a minimum hardware resource quantity).

The virtual machine 121 of the user described with reference to S1 of FIG. 13 is generated through the above process. The user thereafter uses the virtual machine 121 via the user terminal system 50 and causes the virtual machine 121 to execute a variety of information processes.

Routine of Modification Process of Hardware Resource Quantity

Figure 14:
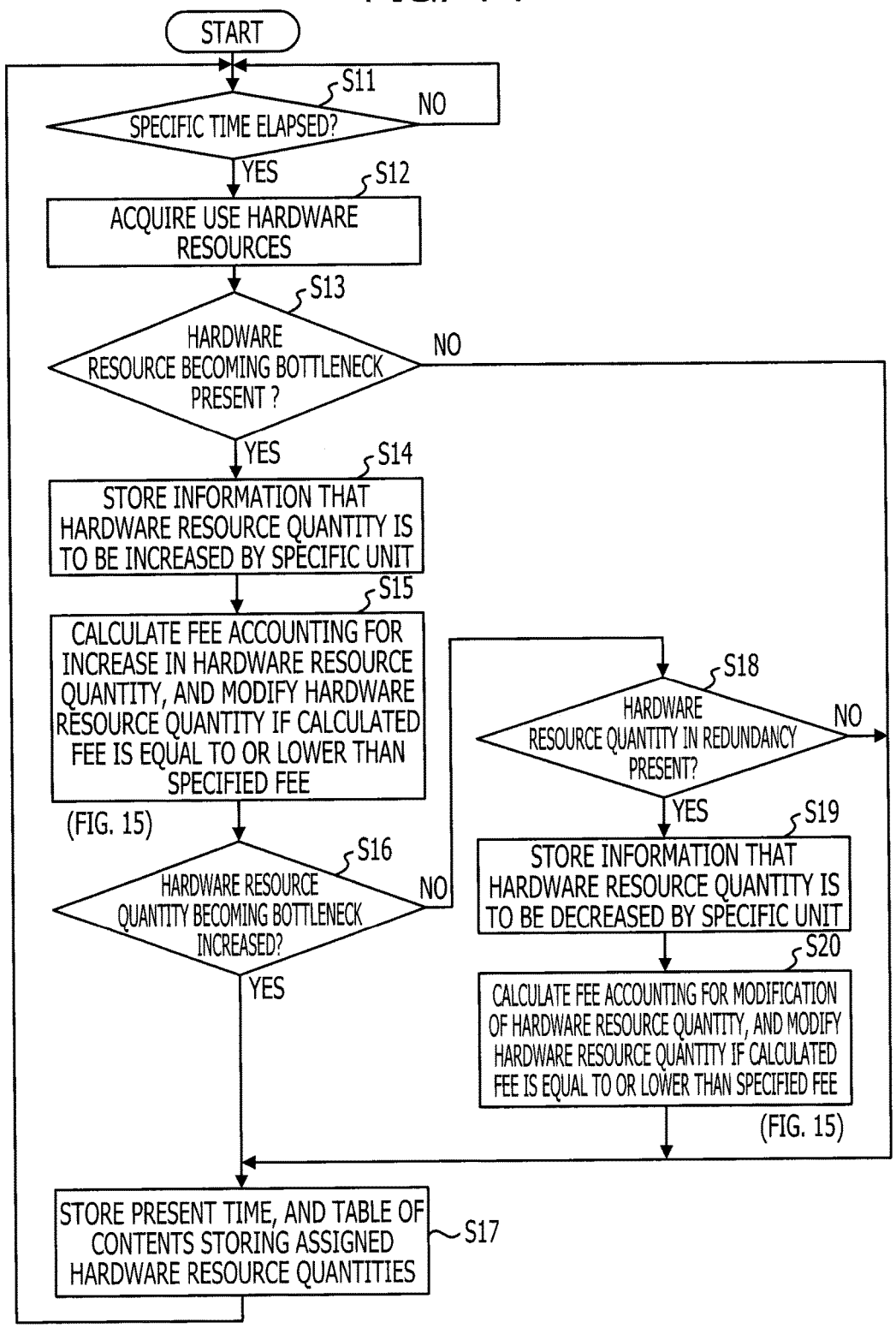
FIG. 14 is an example of a flowchart illustrating a routine of a modification process of the hardware resource quantities to be assigned to the virtual machine.
Figure 15:
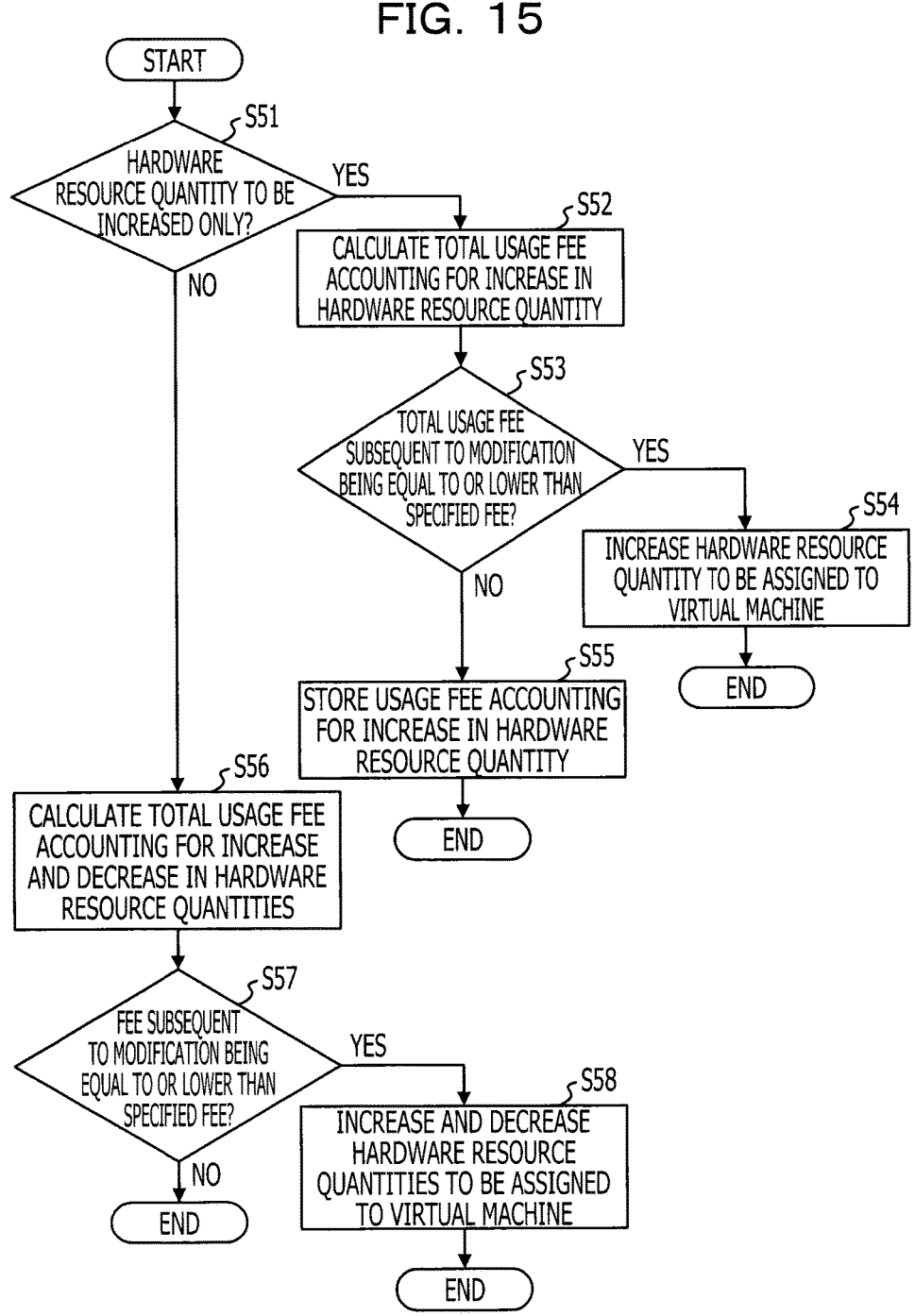
FIG. 15 is an example of a flowchart illustrating the modification process of FIG. 14.

FIG. 14 is an example of a flowchart illustrating a routine of a modification process of the hardware resource quantity to be assigned to the virtual machine. FIG. 15 is an example of a flowchart illustrating the modification process of FIG. 14.

The modification process of FIG. 14 is described first.

In S11, the performance information collection instruction unit 213 in the management server apparatus 20 determines whether a specific period of time has elapsed with the virtual machine 121 executing the variety of information processes. The specific period of time may be 10 minutes, for example.

If the specific period of time has not elapsed (no branch from S11), processing returns to S11. If the specific period of time has elapsed (yes branch from S11), processing proceeds to S12. An acquisition process of the hardware resource quantity is performed.

In S12, the performance information acquisition unit 214 in the management server apparatus 20 acquires the hardware resource quantities used by the virtual machine 121. The detail of the acquisition process has been previously described with reference to FIG. 4, and the description thereof is omitted herein.

In S13, the performance insufficiency detection unit 215 detects a hardware resource quantity becoming a bottleneck from among the hardware resource quantities used by the virtual machine 121.

If the performance insufficiency detection unit 215 determines that a hardware resource quantity becoming a bottleneck is present among the hardware resource quantities used by the virtual machine 121 (yes branch from S13), processing proceeds to S14.

In S14, the management control unit 211 stores on the memory 202 information that the hardware resource quantity becoming the bottleneck is to be increased by a specific unit.

In S15, the fee calculation unit 219 calculates a fee accounting for the modification (increase) of the hardware resource quantity. If the fee of the modified hardware resource quantity is equal to or lower than the specified fee, the performance stepup control unit 217 increases the hardware resource quantity becoming the bottleneck. The operation in S15 is described in detail with reference to the routine of FIG. 15.

In S16, the management control unit 211 determines whether the hardware resource quantity to be assigned to the virtual machine 121 has been increased in S15. It is assumed that the hardware resource quantity to be assigned to the virtual machine 121 has been increased in S15 (yes branch from S16), processing proceeds to S17.

In S17, the management control unit 211 logs on the memory 202 the present time, and contents in the table storing the hardware resource quantities assigned to the virtual machine 121.

Processing returns to S11 to repeat the routine of S11 through S17. If the hardware resource quantities assigned to the virtual machine 121 successively increase in the process as described with reference to FIG. 9A, the total usage fee Ftl of the virtual machine 121 also successively increases. The total usage fee Ftl may exceed the fee specified by the user.

The management control unit 211 then determines that the fee responsive to an increase of the specific unit in the assigned hardware resource quantity is above the fee specified by the user, and does not increase the assigned hardware resource quantity by the specific unit (no branch from S16). Processing proceeds to S18.

In S18, the performance redundancy detection unit 216 detects a hardware resource quantity in performance redundancy.

If the performance redundancy detection unit 216 determines that a hardware resource in performance redundancy exists (yes branch from S18), processing proceeds to S19.

In S19, the management control unit 211 stores on the memory 202 information that the hardware resource quantity in performance redundancy is to be decreased.

In S20, the fee calculation unit 219 calculates a fee accounting for the modification (the increase and decrease) of the hardware resource quantities. If the fee of the modified hardware resource quantities is equal to or lower than the specified fee, the performance stepup control unit 217 increases the hardware resource quantity becoming the bottleneck. The performance stepdown control unit 218 decreases the hardware resource quantity in performance redundancy. The operation in S20 is described in detail with reference to the routine of FIG. 15.

FIG. 15 illustrates a detailed routine of S15 and S20 of FIG. 14. More specifically, in the routine of FIG. 15, the total usage fee Ftl is calculated with the hardware resource quantities assigned to the virtual machine 121 modified. If the total usage fee Ftl is equal to or lower than the specified fee, the hardware resource quantities to be assigned to the virtual machine 121 are modified.

The routine in S15 is described first.

In S51, the management control unit 211 in the management server apparatus 20 determines whether the hardware resource quantity to be assigned to the virtual machine 121 is to be increased only. More specifically, the management control unit 211 determines whether the information that the hardware resource quantity becoming the bottleneck is to be increased has been stored in S14 of FIG. 14 on the memory 202.

In the above example, the management control unit 211 stores on the memory 202 the information that the hardware resource quantity becoming the bottleneck is to be increased. The management control unit 211 thus determines that the hardware resource quantity becoming the bottleneck is to be increased (yes branch in S51), and processing proceeds to S52.

In S52, the fee calculation unit 219 calculates the total usage fee Ftl accounting for an increase of the specific unit in the hardware resource quantity becoming the bottleneck (see expression (1)).

In S53, the management control unit 211 determines whether the total usage fee Ftl is equal to or lower than the fee specified by the user.

The management control unit 211 here determines that the total usage fee Ftl is equal to or lower than the fee specified by the user (yes branch from S53), and processing proceeds to S54.

In S54, the performance stepup control unit 217 instructs the virtualization unit 13 to increase the hardware resource quantity becoming the bottleneck by the specific unit. In response to the increase instruction, the virtualization unit 13 increases the hardware resource quantity becoming the bottleneck by the specific unit.

Subsequent to the modification, processing proceeds to S16 of FIG. 14. As illustrated in FIG. 14, operation in S15 of FIG. 14 (routine in S52 through S54 of FIG. 15) is iterated. The increasing of the assigned hardware resource quantity is thus successively iterated. The total usage fee Ftl of the repeatedly increased assigned hardware resource quantity may exceed the specified fee (no branch from S53), and processing proceeds to S55. In such a case, the increase process (S54 of FIG. 15) of the hardware resource quantity assigned to the virtual machine 121 is not performed.

In S55, the management control unit 211 stores on the memory 202 the modification added fee Fadd calculated by the fee calculation unit 219 in S52. Processing proceeds to S16 of FIG. 14.

Since the increase process of the hardware resource quantity assigned to the virtual machine 121 is not performed, the management control unit 211 determines that the determination block in S16 is negative. Processing proceeds to S18.

Operations in S18 through S20 are performed. In S18, the performance redundancy detection unit 216 may detect the hardware resource quantity in performance redundancy (yes branch from S18). In such a case, operation in S19 is performed, followed by operation in S20.

In S20, the fee calculation unit 219 calculates the final fee accounting for the fee caused by increasing the hardware resource quantity stored in S55 of FIG. 15 and the fee for the modification (the increase and decrease) of the hardware resource quantities. The operation in S20 is described with reference to a routine of FIG. 20.

In S51, the fee calculation unit 219 in the management server apparatus 20 determines whether the hardware resource quantity is to be increased only. In the above example, the hardware resource quantity is decreased, and the determination block in S51 is negative. Processing proceeds to S56.

In S56, the fee calculation unit 219 calculates the total usage fee Ftl with the use hardware resource quantities increased and decreased (see expression (2)).

In S57, the management control unit 211 determines whether the total usage fee Ftl accounting for the modification of the hardware resource quantity to be assigned to the virtual machine 121 is equal to or lower than the fee specified by the user.

If the total usage fee Ftl accounting for the modification of the hardware resource quantity to be assigned to the virtual machine 121 is equal to or lower than the fee specified by the user (yes branch from S57), processing proceeds to S58.

In S58, the performance stepup control unit 217 instructs the virtualization unit 13 to increase the hardware resource quantity becoming the bottleneck by the specific unit. The performance stepdown control unit 218 instructs the virtualization unit 13 to decrease the hardware resource quantity in performance redundancy by the specific unit.

In response to the increase instruction, the virtualization unit 13 increases the hardware resource quantity becoming the bottleneck by the specific unit.

In response to the decrease instruction, the virtualization unit 13 decreases the hardware resource quantity in performance redundancy by the specific unit.

Processing returns to S20 of FIG. 14. After the logging process of the performance value of the virtual machine 121 in S17, processing returns to S11. The management control unit 211 performs the logging process in S17 if there is no hardware resource quantity becoming a bottleneck (no branch from S13), if there is no hardware resource quantity that may be decreased (no branch from S18), or if the total usage fee Ftl after the modification of the hardware resource quantity to be assigned to the virtual machine 121 is above the fee specified by the user (no branch from S57 of FIG. 15). Processing then returns to S11 again.

According to the embodiment, the provider of the cloud service may provide a virtual machine that is operative in fine adjustments of the hardware resource quantities of CPU, memory, HDD, and NIC, and thus may charge a usage fee of the finely adjusted virtual machine on the user.

The hardware resource quantities to be assigned to the virtual machine 121 may be automatically optimized to be suitable for contents of the information process that is executed by the virtual machine 121. The user is set free from manually adjusting the hardware resource quantity in consideration of the contents of the information process. The user may enjoy cloud service smoothly.

As a result, information processing time becomes shorter, and the user is free from a stressful business operation in the cloud service.

As described with reference to FIG. 9B, the hardware resource quantity becoming the bottleneck of the virtual machine 121 may be successively increased and the usage fee may exceed the specified fee. In this case, however, by decreasing the hardware resource quantity in performance redundancy, the hardware resource quantity becoming the bottleneck is still increased with the usage fee kept to be equal to or lower than the specified fee.

A charge is billed on a virtual machine having the optimized hardware resource quantities, but not billed on an unnecessary hardware resource quantity. The user thus enjoys an economical service. Since the hardware resource quantities assigned to the virtual machine 121 are optimized, the provider is set free from preparing unnecessary hardware resource quantity. The provider may provide the services economically because an expansion of the hardware resource quantities for the virtual machine is controlled. As a result, the usage fee of the cloud service is kept low, and the user and the provider will benefit from these features.

Detailed Description of Process of Decreasing Hardware Resource Quantity

A process of increasing and decreasing the hardware resource quantities to be assigned to the virtual machine 121 is described below. The process of increasing and decreasing the hardware resource quantities, i.e., a process through S13 through S20 of FIG. 14 is described more in detail. As previously described with reference to FIG. 13, the virtual machine execution apparatus 10 has already generated the virtual machine 121. FIGS. 16 through 21 is an example of a flowchart illustrating first through sixth routines of the modification process of the hardware resource quantities to be assigned to the virtual machine.

S101 and S102 are respectively same as S11 and S12 of FIG. 14, and the discussion thereof is omitted herein. When operation in S102 is complete, processing proceeds to S103.

In S103, the performance insufficiency detection unit 215 in the management server apparatus 20 determines whether the CPU 101 assigned to the virtual machine 121 has performance insufficiency.

The performance insufficiency detection unit 215 determines whether a hardware resource quantity of the CPU 101 used by the virtual machine 121 is equal to or larger than the upper limit hardware resource quantity (see FIG. 7A). It is assumed that the hardware resource quantity of the CPU 101 used by the virtual machine 121 is a clock count. If the hardware resource quantity of the CPU 101 used by the virtual machine 121 is equal to or larger than the upper limit hardware resource quantity (yes branch from S103), processing proceeds to S104.

In S104, the performance stepup possibility determination unit 221 in the management server apparatus 20 determines whether the clock count of the CPU 101 assigned to the virtual machine 121 may be increased by a specific unit. If a clock count resulting from increasing the clock count of the CPU 101 assigned to the virtual machine 121 by a specific unit is equal to or lower than a maximum clock count of the CPU 101, the performance stepup possibility determination unit 221 determines that the clock count of the CPU 101 assigned to the virtual machine 121 may be increased by the specific unit (yes branch from S104). Processing proceeds to S105. The maximum clock count of the CPU 101 is 3.0 GHz, for example.

In S105, the management control unit 211 stores on the memory 202 information that the clock count to be assigned to the virtual machine 121 is to be increased by the specific unit.

If the performance stepup possibility determination unit 221 determines in S104 that it is difficult to increase the clock count of the CPU 101 assigned to the virtual machine 121 by the specific unit (no branch from S104), processing proceeds to S106.

In S106, the performance stepup possibility determination unit 221 determines whether a core count of the CPU 101 assigned to the virtual machine 121 may be increased by a specific unit.

If a core count resulting from increasing the core count of the CPU 101 assigned to the virtual machine 121 by the specific unit is equal to or lower than a maximum core count of the CPU 101, the performance stepup possibility determination unit 221 determines that the core count of the CPU 101 assigned to the virtual machine 121 may be increased by the specific unit (yes branch from S106), and proceeds to S107. The maximum core count is 2, for example.

In S107, the management control unit 211 stores on the memory 202 information that the core count of the CPU 101 to be assigned to the virtual machine 121 is to be increased by the specific unit.

Figure 17:
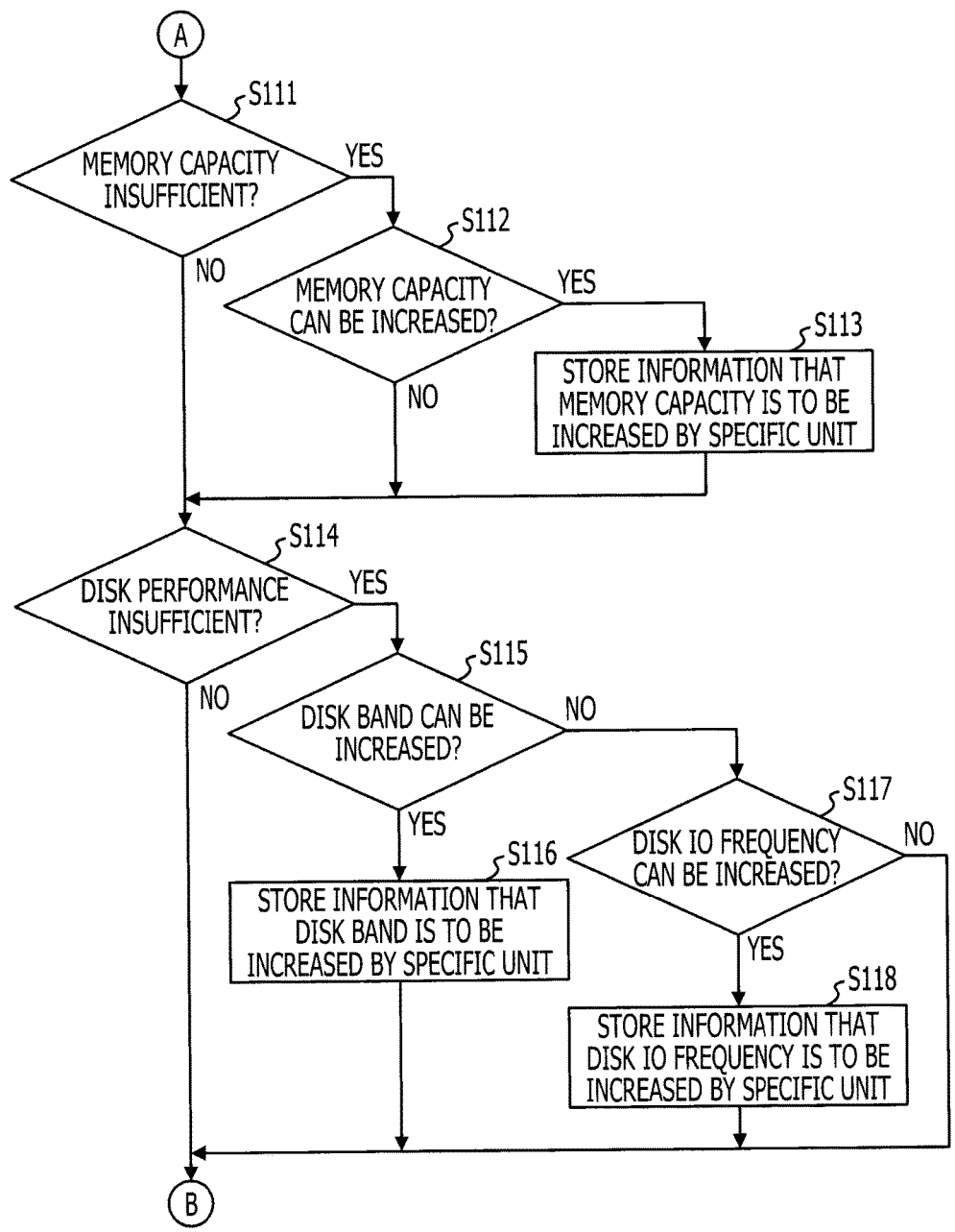
FIG. 17 is an example of a flowchart illustrating in detail a second routine of the modification process of the hardware resource quantities to be assigned to the virtual machine.

Processing proceeds to S111 of FIG. 17 subsequent to S107, or subsequent to S105, or if the performance stepup possibility determination unit 221 determines that it is difficult to increase the core count of the CPU 101 assigned to the virtual machine 121 by the specific unit (no branch from S106). In the example of FIG. 5C and FIG. 7A, the CPU 101 has no performance insufficiency (no branch from S103), and processing proceeds to S111 of FIG. 17.

Figure 16:
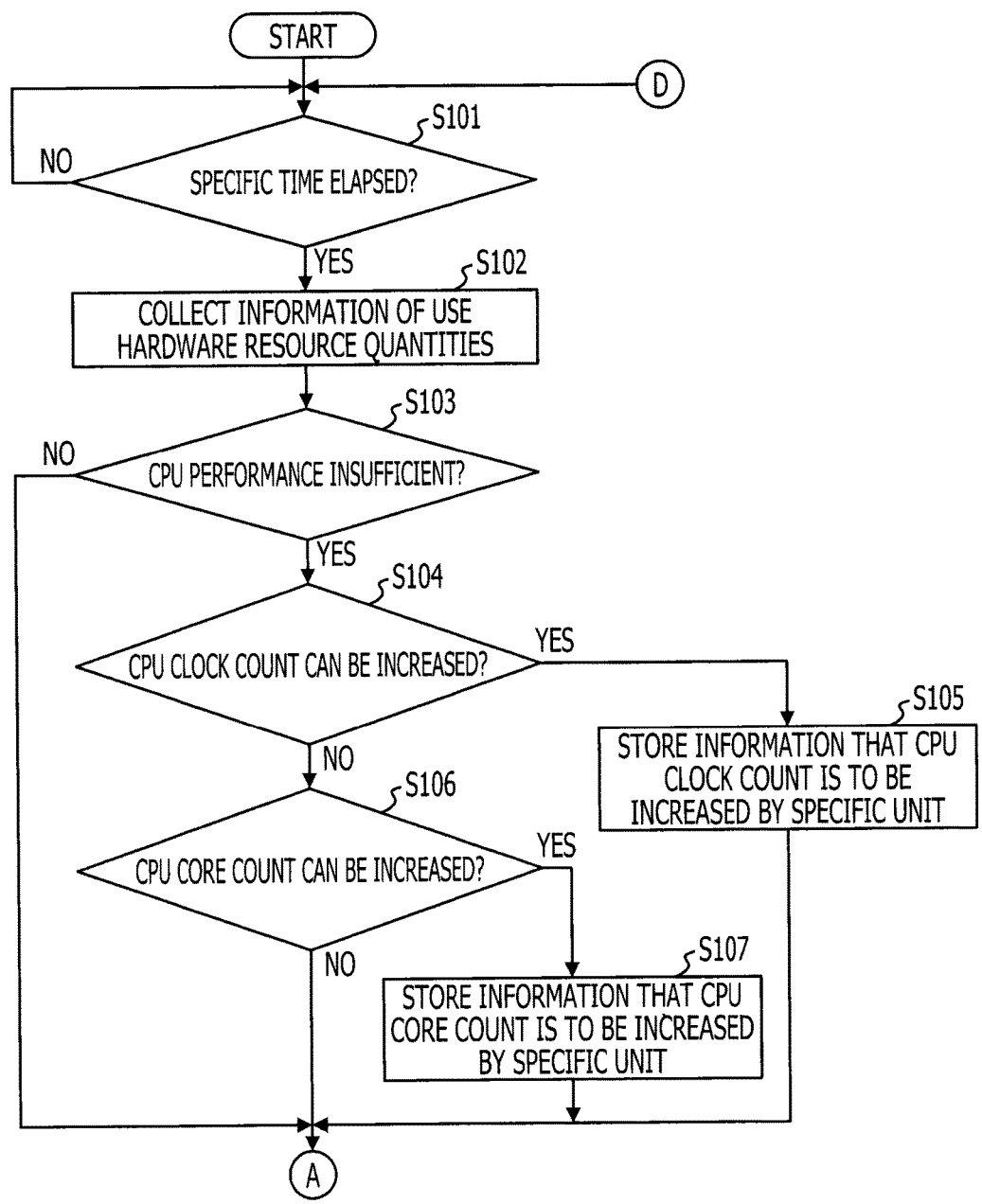
FIG. 16 is an example of a flowchart illustrating a first routine of a modification process of the hardware resource quantities to be assigned to the virtual machine.

The routine of FIG. 16 is followed by a routine of FIG. 17, which starts with S111.

In S111, the performance insufficiency detection unit 215 determines whether a memory capacity assigned to the virtual machine 121 is insufficient. More specifically, the performance insufficiency detection unit 215 determines whether a hardware resource quantity (memory capacity) of the memory 103 used by the virtual machine 121 is equal to or larger than the upper limit hardware resource quantity (see FIG. 7A). If the hardware resource quantity (memory capacity) of the memory 103 used by the virtual machine 121 is equal to or larger than the upper limit hardware resource quantity (yes branch from S111), processing proceeds to S112.

In S112, the performance stepup possibility determination unit 221 determines whether a memory capacity assigned to the virtual machine 121 may be increased by a specific unit.

If a memory capacity resulting from increasing the memory capacity of the memory 103 assigned to the virtual machine 121 by the specific unit is equal to or lower than a maximum memory capacity of the memory 103, the performance stepup possibility determination unit 221 determines that the memory capacity assigned to the virtual machine 121 may be increased by the specific unit (yes branch from S112), and proceeds to S113. The maximum memory capacity of the memory 103 is 8.0 GB, for example.

In S113, the management control unit 211 stores on the memory 202 information that the memory capacity to be assigned to the virtual machine 121 is to be increased by the specific unit.

Processing proceeds to S114 subsequent to S113, or if the memory capacity assigned to the virtual machine 121 is not insufficient (no branch from S111), or if it is determined that it is difficult to increase the memory capacity assigned to the virtual machine 121 by the specific unit (no branch from S112). Since the memory capacity of the memory 202 is not insufficient in the example of FIG. 5C and FIG. 7A, the memory capacity of the memory 202 is not insufficient (no branch from S111), and processing proceeds to S114.

In S114, the performance insufficiency detection unit 215 determines whether disk performance of the HDD 104 assigned to the virtual machine 121 is insufficient.

More specifically, the performance insufficiency detection unit 215 determines whether the hardware resource quantity of the HDD 104 used by the virtual machine 121 is equal to or larger than the upper limit hardware resource quantity (see FIG. 7A). It is assumed herein that the hardware resource quantity of the HDD 104 used by the virtual machine 121 is within the disk band of the HDD 104. If the hardware resource quantity of the HDD 104 used by the virtual machine 121 is equal to or larger than the upper limit hardware resource quantity (yes branch from S114), processing proceeds to S115.

In S115, the performance stepup possibility determination unit 221 determines whether the disk band of the HDD 104 assigned to the virtual machine 121 may be increased by a specific unit. If a disk band resulting from increasing the disk band of the HDD 104 assigned to the virtual machine 121 by the specific unit is equal to or lower than the maximum disk band of the HDD 104, the performance stepup possibility determination unit 221 determines that the disk band of the HDD 104 assigned to the virtual machine 121 may be increased by the specific unit (yes branch from S115), and proceeds to S116. The maximum disk band of the HDD 104 is 200 MB/s.

In S116, the management control unit 211 stores on the memory 202 information that the disk band of the HDD 104 to be assigned to the virtual machine 121 is to be increased by the specific unit.

If the performance stepup possibility determination unit 221 determines in S115 that it is difficult to increase the disk band of the HDD 104 assigned to the virtual machine 121 by the specific unit (no branch from S115), processing proceeds to S117.

In S117, the performance stepup possibility determination unit 221 determines a disk IO frequency of the HDD 104 assigned to the virtual machine 121 may be increased by a specific unit.

If a disk IO frequency resulting from increasing the disk IO frequency of the HDD 104 assigned to the virtual machine 121 by the specific unit is equal to or lower than a maximum IO frequency of the HDD 104, the performance stepup possibility determination unit 221 determines that the disk IO frequency of the HDD 104 assigned to the virtual machine 121 may be increased by the specific unit (yes branch from S117), and then proceeds to S118. The maximum IO frequency of the HDD 104 is 800 IOPS, for example.

In S118, the management control unit 211 stores on the memory 202 information that the disk IO frequency of the HDD 104 to be assigned to the virtual machine 121 is to be increased by the specific unit.

Figure 18:
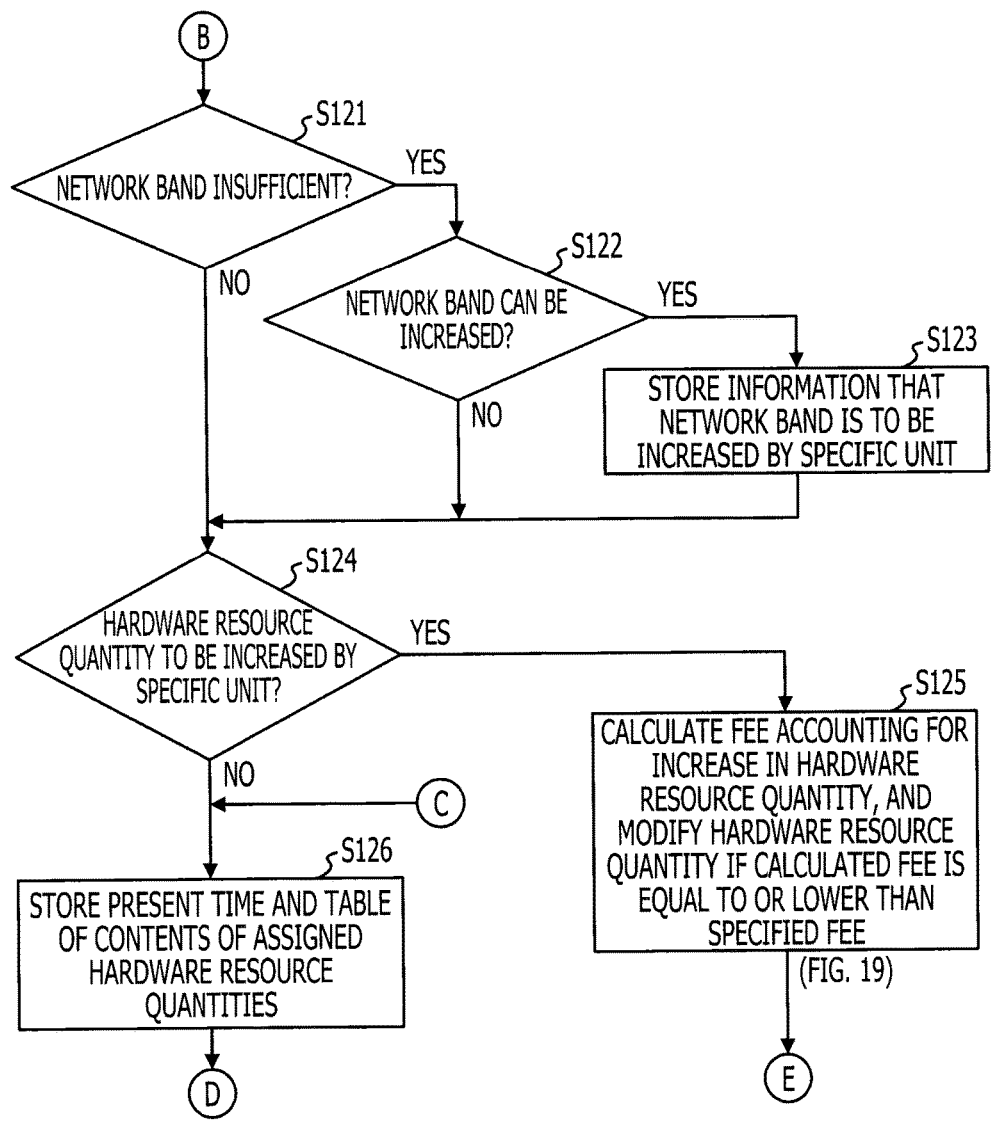
FIG. 18 is an example of a flowchart illustrating in detail a third routine of the modification process of the hardware resource quantities to be assigned to the virtual machine.

Processing proceeds to S121 of FIG. 18, subsequent to S118, or subsequent to S116, or if the HDD 104 has no performance insufficiency (no branch from S114), or if the performance stepup possibility determination unit 221 determines that it is difficult to increase the disk IO frequency of the CPU 101 assigned to the virtual machine 121 by the specific unit (no branch from S117). Since the HDD 104 has no performance insufficiency in the example of FIGS. 5C and 7A (no branch from S114), processing proceeds to S121 of FIG. 18.

The routine of FIG. 17 is followed by a routine of FIG. 18, which starts with S121.

In S121, the performance insufficiency detection unit 215 determines whether the network band assigned to the virtual machine 121 is insufficient. More specifically, the performance insufficiency detection unit 215 determines whether a hardware resource quantity (network band) of the NIC 105 assigned to the virtual machine 121 is equal to or larger than the upper limit hardware resource quantity (see FIG. 7A). If the hardware resource quantity (network band) of the NIC 105 assigned to the virtual machine 121 is equal to or larger than the upper limit hardware resource quantity (yes branch from S121), processing proceeds to S122.

In S122, the performance stepup possibility determination unit 221 determines whether the network band of the NIC 105 assigned to the virtual machine 121 may be increased by a specific unit. If a network band resulting from increasing the network band of the NIC 105 assigned to the virtual machine 121 by the specific unit is equal to or smaller than a maximum network of the NIC 105, the performance stepup possibility determination unit 221 determines that the network band of the NIC 105 assigned to the virtual machine 121 may be increased by the specific unit (yes branch from S122), and then proceeds to S123. The maximum network band of the NIC 105 is 2 Gbps, for example.

In S123, the management control unit 211 stores on the memory 202 information that the network band to be assigned to the virtual machine 121 is to be increased by the specific unit.

Processing proceeds to S124, subsequent to S123, or if the network band assigned to the virtual machine 121 is not insufficient (no branch from S121), or if the performance stepup possibility determination unit 221 determines that it is difficult to increase the network band of the NIC 105 assigned to the virtual machine 121 by the specific unit (no branch from S122). Since the network band assigned to the virtual machine 121 is insufficient in the example of FIGS. 5C and 7A (yes branch from S121), operation in S123 is executed. Processing proceeds to S124.

In S124, the management control unit 211 determines whether to increase the hardware resource quantity assigned to the virtual machine 121 by a specific unit. More specifically, the management control unit 211 determines whether there is a hardware resource to be stepped up.

More specifically, this determination operation is positive if the management control unit 211 stores on the memory 202 in S105 of FIG. 16 that the hardware resource quantity to be assigned to the virtual machine 121 is to be increased. If the hardware resource quantity to be assigned to the virtual machine 121 is to be increased (yes branch from S124), processing proceeds to S125.

In S125, the fee calculation unit 219 calculates the fee accounting for the modification (increase) of the hardware resource quantity. If the fee of the modified hardware resource quantity is equal to or lower than the specified fee, the performance stepup control unit 217 increases the hardware resource quantity becoming the bottleneck. The operation in S125 is identical to the operation in S15 of FIG. 14.

The operation in S125 is described with reference to a routine of FIG. 19.

Figure 19:
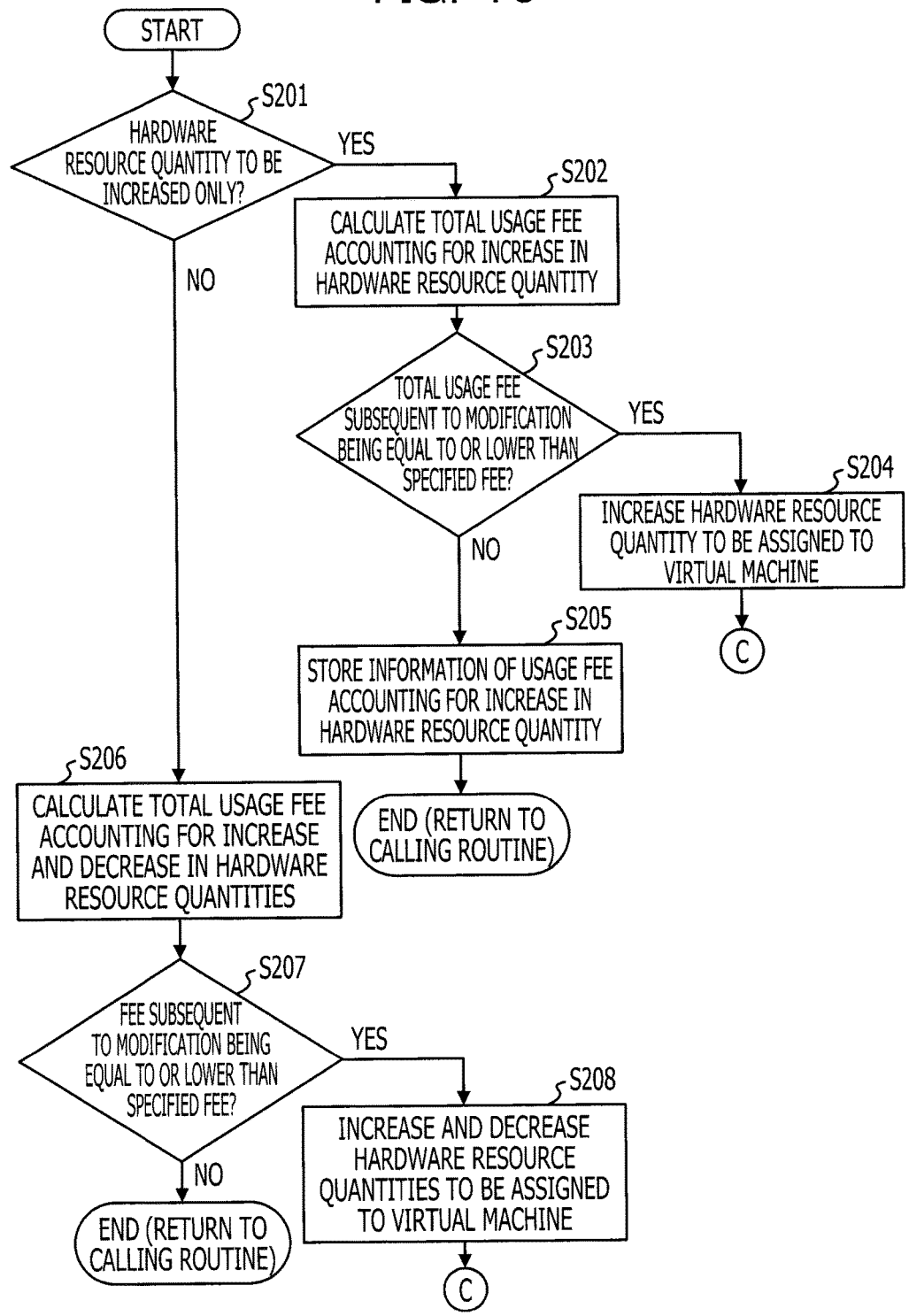
FIG. 19 is an example of a flowchart illustrating in detail a fourth routine of the modification process of the hardware resource quantities to be assigned to the virtual machine.

FIG. 19 illustrates the routine of a modification process of the hardware resource quantity. In the modification process of FIG. 19, the total usage fee Ftl is calculated with the hardware resource quantity to be assigned to the virtual machine 121 modified, and if the total usage fee Ftl is equal to or lower than the specified fee, the hardware resource quantity to be assigned to the virtual machine 121 is modified.

In S201, the performance stepup control unit 217 in the management server apparatus 20 determines whether the hardware resource quantity to be assigned to the virtual machine 121 is to be increased only.

In the above discussion, the management control unit 211 stores on the memory 202 the information that the hardware resource quantity to be assigned to the virtual machine 121 is to be increased by the specific unit. The performance stepup control unit 217 determines that the hardware resource quantity to be assigned to the virtual machine 121 is to be increased (yes branch from S201), and then processing proceeds to S202.

In S202, the fee calculation unit 219 calculates the total usage fee Ftl when the hardware resource quantity becoming the bottleneck has been increased by the specific unit. The calculation operation has been discussed with reference to S52 of FIG. 15, and is not discussed herein.

In S203, the management control unit 211 determines whether the total usage fee Ftl subsequent to the modification of the hardware resource quantity is equal to or lower than the fee specified by the user.

If the total usage fee Ftl is equal to or lower than the specified fee (yes branch from S203), processing proceeds to S204.

In S204, the performance stepup control unit 217 instructs the virtualization unit 13 to increase the hardware resource quantity becoming the bottleneck by the specific unit. In response to the increase instruction, the virtualization unit 13 increases the hardware resource quantity becoming the bottleneck by the specific unit. The increase process has been discussed with reference to S54 of FIG. 15. In this way, the bottleneck is cleared. As a result, the user may enjoy cloud service smoothly.

Processing proceeds to S126 of FIG. 18.

In S126, the management control unit 211 logs to the memory 202 the present time, and the table of contents storing the hardware resource quantities assigned to the virtual machine 121.

Processing returns to S101 of FIG. 16. Operations in S101 through S126 of FIG. 18 are iterated. In this process, the total usage fee Ftl22 of the virtual machine 121 exceeds the fee specified by the user as discussed with reference to FIG. 11.

If the management control unit 211 determines in S203 of FIG. 19 that a fee resulting from increasing the assigned hardware resource quantity by the specific unit exceed the fee specified by the user (no branch from S203), it is difficult to increase the assigned hardware resource quantity no longer, and processing proceeds to S205.

In S205, the management control unit 211 stores on the memory 202 the modification added fee Fadd calculated by the fee calculation unit 219 in S202.

Processing returns to S125 of FIG. 18, which is the calling routine of FIG. 19. Processing then proceeds to S131 of FIG. 20.

Figure 20:
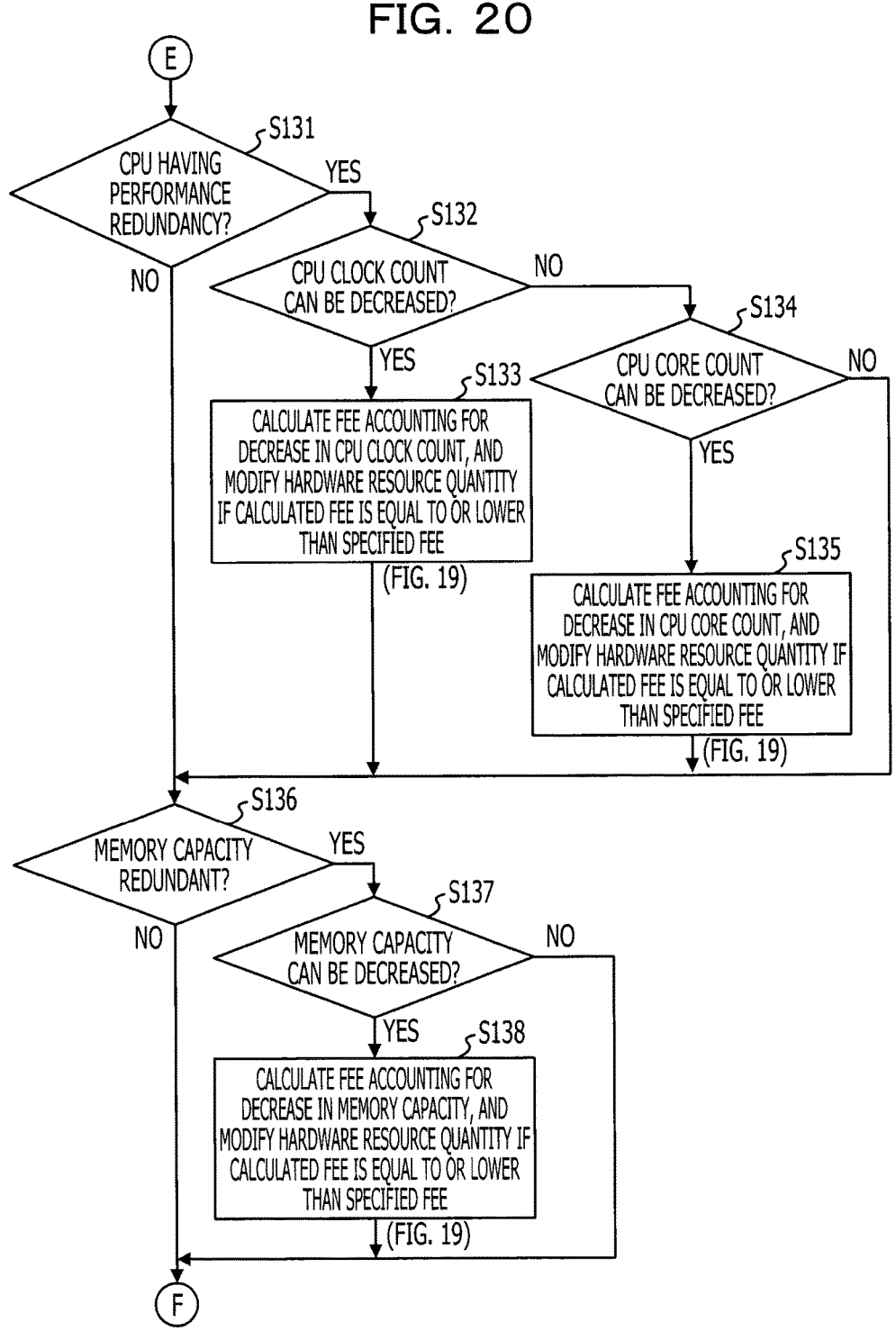
FIG. 20 is an example of a flowchart illustrating in detail a fifth routine of the modification process of the hardware resource quantities to be assigned to the virtual machine.

FIG. 20 illustrates a routine subsequent to S125 of FIG. 18. The discussion of the routine of FIG. 20 starts with S131.

In S131, the performance redundancy detection unit 216 in the management server apparatus 20 determines whether the CPU 101 assigned to the virtual machine 121 has a performance redundancy.

More specifically, the performance redundancy detection unit 216 determines whether the hardware resource quantity of the CPU 101 used by the virtual machine 121 is lower than a lower limit hardware resource quantity (see FIG. 10C). The hardware resource quantity of the CPU 101 used by the virtual machine 121 may now be a clock count. If the hardware resource quantity (clock count) of the CPU 101 used by the virtual machine 121 is lower than the lower limit hardware resource quantity (yes branch from S131), processing proceeds to S132.

In S132, the performance stepdown possibility determination unit 222 in the management server apparatus 20 determines whether the clock count of the CPU 101 assigned to the virtual machine 121 may be decreased by a specific unit. If a clock count resulting from decreasing the clock count of the CPU 101 assigned to the virtual machine 121 is equal to or higher than a minimum clock count of the CPU 101, the performance stepdown possibility determination unit 222 determines that the clock count of the CPU 101 assigned to the virtual machine 121 may be decreased by the specific unit (yes branch from S132), and proceeds to S133. The minimum clock count is 10 percent of the maximum clock count of the CPU 101, for example.

In S133, the fee calculation unit 219 calculates the total usage fee Ftl with the clock count of the CPU 101 decreased (modified). If the fee the modified hardware resource quantity is equal to or lower than the specified fee, the performance stepup control unit 217 increases the hardware resource quantity becoming the bottleneck. The performance stepdown control unit 218 decreases the hardware resource quantity in performance redundancy (clock count of the CPU 101).

The operation in S133 of FIG. 20 is identical to the operation in S20 of FIG. 14. More specifically, the routine of FIG. 19 starting with S201 is performed.

In S201 of FIG. 19, the fee calculation unit 219 in the management server apparatus 20 determines whether the hardware resource quantity is to be increased only. In the above example, the hardware resource quantity is decreased, and determination block in S201 is negative. Processing proceeds to S206.

In S206, the fee calculation unit 219 calculates the total usage fee Ftl if the hardware resource quantities have been increased and decreased. The fee calculation operation has been discussed with reference to S56 of FIG. 15, and is not repeated herein.

In S207, the management control unit 211 determines whether the total usage fee Ftl when the hardware resource quantities to be assigned to the virtual machine 121 have been modified is equal to or lower than the fee specified by the user.

If the total usage fee Ftl subsequent to the modification of the hardware resource quantities is equal to or lower than the fee specified by the user (yes branch from S207), processing proceeds to S208.

In S208, the performance stepup control unit 217 instructs the virtualization unit 13 to increase the hardware resource quantity becoming the bottleneck by the specific unit. The performance stepdown control unit 218 instructs the virtualization unit 13 to decrease the hardware resource quantity in performance redundancy by the specific unit. The instruction has been discussed with reference to S58 of FIG. 15, and is not discussed here. Processing proceeds to S126 of FIG. 18.

If the total usage fee Ftl exceeds the fee specified by the user (no branch from S207), processing returns to S135 of the calling routine of FIG. 20.

If the performance stepdown possibility determination unit 222 determines in S132 of FIG. 20 that it is difficult to decrease the clock count of the CPU 101 assigned to the virtual machine 121 by the specific unit (no branch from S132), processing proceeds to S134.

In S134, the performance stepdown possibility determination unit 222 determines whether the core count of the CPU 101 assigned to the virtual machine 121 may be decreased by a specific unit.

If a core count resulting from decreasing the core count of the CPU 101 assigned to the virtual machine 121 by the specific unit is equal to or higher than a minimum core count of the CPU 101, the performance stepdown possibility determination unit 222 determines that the core count of the CPU 101 assigned to the virtual machine 121 may be decreased by the specific unit (yes branch from S134), and then proceeds to S135. The minimum core count of the CPU 101 is 1, for example.

In S135, the fee calculation unit 219 calculates the total usage fee Ftl if the core count of the CPU 101 has been decreased (modified). The fee of the modified hardware resource quantity is equal to or lower than the specified fee, the performance stepup control unit 217 increases the hardware resource quantity becoming the bottleneck. The performance stepdown control unit 218 decreases the hardware resource quantity (core count) of the hardware resource in performance redundancy.

The operation in S135 of FIG. 20 is identical to the operation in S20 of FIG. 14. More specifically, the process of FIG. 19 is performed, starting with S201. The process of FIG. 19 has been described previously. If the total usage fee Ftl calculated in S206 of FIG. 19 exceeds the fee specified by the user (no branch from S207 of FIG. 19), processing returns to S135 of the calling routine of FIG. 20.

Processing proceeds to S136 subsequent to S135, or subsequent to S133, or if the CPU has no performance insufficiency (no branch from S131), or if the performance stepdown possibility determination unit 222 determines that it is difficult to decrease the core count of the CPU 101 assigned to the virtual machine 121 by the specific unit (no branch from S134).

Since the CPU 101 has no performance insufficiency in the example of FIGS. 10B and 10C (no branch from S131), processing proceeds to S136.

In S136 of FIG. 20, the performance redundancy detection unit 216 determines whether the memory capacity assigned to the virtual machine 121 is redundant. More specifically, the performance redundancy detection unit 216 determines whether the hardware resource quantity (memory capacity) of the memory 103 used by the virtual machine 121 is lower than a lower limit hardware resource quantity (see FIG. 10C). If the hardware resource quantity (memory capacity) of the memory 103 used by the virtual machine 121 is lower than the lower limit hardware resource quantity (yes branch from S136), processing proceeds to S137.

In S137, the performance stepdown possibility determination unit 222 determines whether a memory capacity assigned to the virtual machine 121 may be decreased by a specific unit. If a memory capacity resulting from decreasing the memory capacity assigned to the virtual machine 121 by the specific unit is equal to or higher than a minimum memory capacity of the memory 103, the performance stepdown possibility determination unit 222 determines that the memory capacity assigned to the virtual machine 121 may be decreased by the specific unit (yes branch from S137), and proceeds to S138. The minimum memory capacity of the memory 103 may be 10 percent of the maximum memory capacity of the memory 103.

In S138, the fee calculation unit 219 calculates the total usage fee Ftl if the memory capacity has been decreased (modified). If the fee of the modified hardware resource quantity is equal to or lower than the specified fee, the performance stepup control unit 217 increases the hardware resource quantity becoming the bottleneck. Furthermore, the performance stepdown control unit 218 decreases the hardware resource quantity (memory capacity) in redundancy.

The operation in S138 of FIG. 20 is identical to the operation in S20 of FIG. 14.

Figure 21:
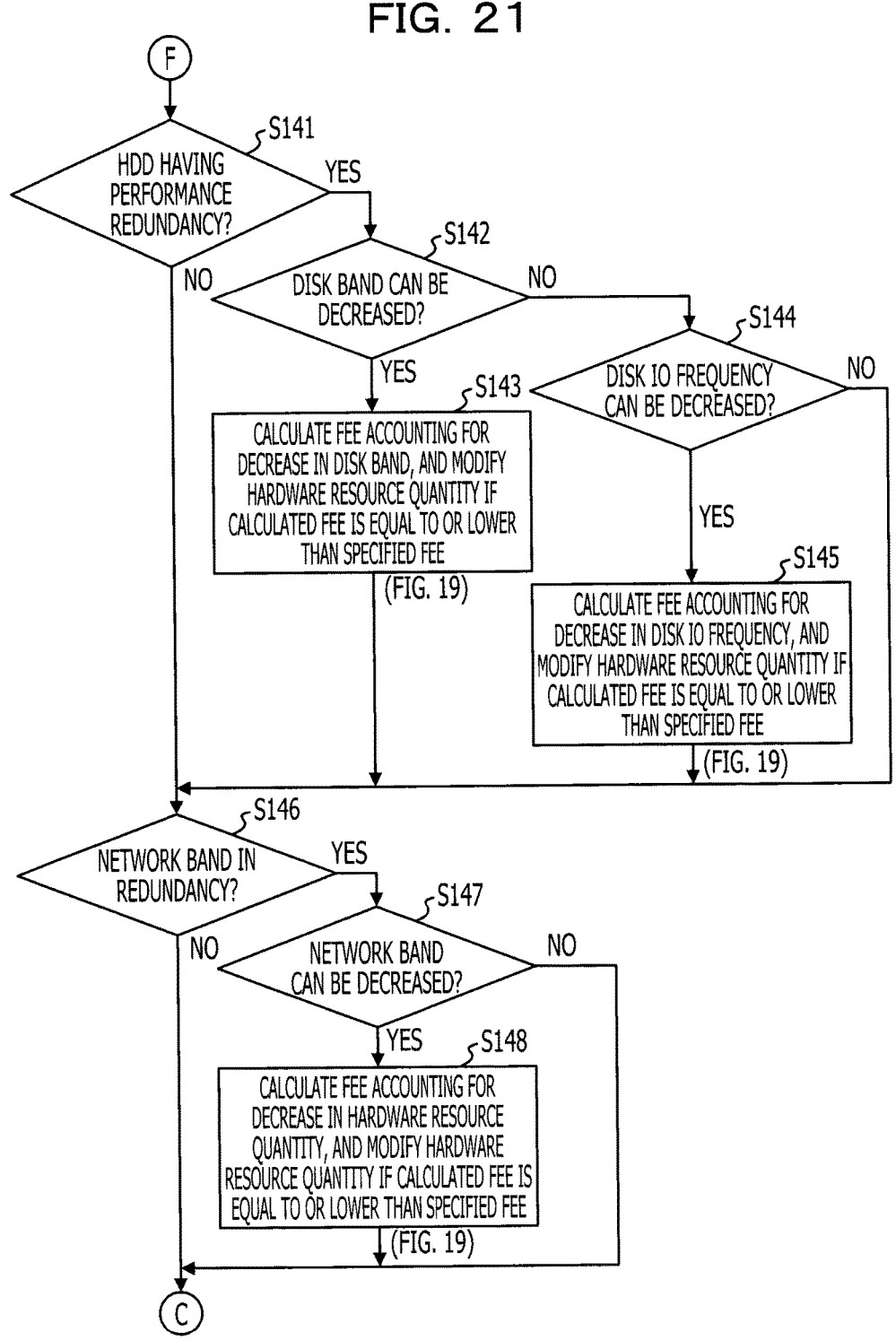
FIG. 21 is an example of a flowchart illustrating in detail a sixth routine of the modification process of the hardware resource quantity to be assigned to the virtual machine.

Processing proceeds to S141 of FIG. 21 subsequent to S138, or if the memory capacity assigned to the virtual machine 121 has no capacity surplus (no branch from S136), or if the performance stepdown possibility determination unit 222 determines that it is difficult to decrease the memory capacity assigned to the virtual machine 121 by the specific unit (no branch from S137).

Since the memory capacity is not redundant (no branch from S136) in the example of FIGS. 10B and 10C, processing proceeds to S141 of FIG. 21.

The routine of FIG. 20 is followed by a routine of FIG. 21, which is described starting with S141.

In S141, the performance redundancy detection unit 216 determines whether the HDD 104 assigned to the virtual machine 121 has a performance redundancy.

More specifically, the performance redundancy detection unit 216 determines that the hardware resource quantity of the HDD 104 used by the virtual machine 121 is lower than the lower limit hardware resource quantity (see FIG. 10C). It is assumed herein that the hardware resource quantity of the HDD 104 used by the virtual machine 121 is a disk band. If the disk band of the HDD 104 used by the virtual machine 121 is lower than the lower limit hardware resource quantity (yes branch from S141), processing proceeds to S142.

In S142, the performance stepdown possibility determination unit 222 determines whether the disk band of the HDD 104 assigned to the virtual machine 121 may be decreased by a specific unit. If a disk band resulting from decreasing the disk band of the HDD 104 assigned to the virtual machine 121 by the specific unit is equal to or larger than the minimum disk band of the HDD 104, the performance stepdown possibility determination unit 222 determines that the disk band of the HDD 104 assigned to the virtual machine 121 may be decreased by the specific unit (yes branch from S142), and then proceeds to S143. The minimum disk band of the HDD 104 is 10 percent of the maximum disk band of the HDD 104, for example.

In S143, the fee calculation unit 219 calculates the total usage fee Ftl if the disk band has been decreased (modified).

If the fee of the modified hardware resource quantity is equal to or lower than the specified fee, the performance stepup control unit 217 increases the hardware resource quantity becoming the bottleneck. Furthermore, the performance stepdown control unit 218 decreases the hardware resource quantity (disk band) in performance redundancy.

The operation in S143 of FIG. 21 is identical to the operation in S20 of FIG. 14.

If the performance stepdown possibility determination unit 222 determines in S142 that it is difficult to decrease the disk band of the HDD 104 assigned to the virtual machine 121 by the specific unit (no branch from S142), processing proceeds to S144.

In S144, the performance stepdown possibility determination unit 222 determines whether a disk IO frequency of the HDD 104 assigned to the virtual machine 121 may be decreased by a specific unit.

If a disk IO frequency resulting from decreasing the disk IO of the HDD 104 assigned to the virtual machine 121 by the specific unit is equal to or higher than a minimum disk IO frequency of the HDD 104, the performance stepdown possibility determination unit 222 determines that the disk IO frequency of the HDD 104 assigned to the virtual machine 121 may be decreased by the specific unit (yes branch from S144), and proceeds to S145. The minimum IO frequency of the HDD 104 is 10 percent of the maximum disk IO frequency of the HDD 104.

In S145, the fee calculation unit 219 calculates the total usage fee Ftl subsequent to the decrease (modification) of the disk IO frequency. If the fee of the modified hardware resource quantity is equal to or lower than the specified fee, the performance stepup control unit 217 increases the hardware resource quantity becoming the bottleneck. Furthermore, the performance stepdown control unit 218 decreases the hardware resource quantity (disk IO frequency) in performance redundancy. The operation in S145 is identical to the operation described with reference to S20 of FIG. 14.

Processing proceeds to S146 subsequent to S145, or subsequent to S143, or if the HDD 104 has no performance redundancy (no branch from S141), or if the performance stepdown possibility determination unit 222 determines that it is difficult to decrease the IO frequency of the HDD 104 assigned to the virtual machine 121 by the specific unit (no branch from S144).

Since the HDD performance is not in redundancy in the example of FIGS. 10B and 10C (no branch from S136), processing proceeds to S146.

It is determined in S146 whether the network band assigned to the virtual machine 121 is in redundancy. More specifically, it is determined whether a hardware resource quantity (network band) of the NIC 105 used by the virtual machine 121 is lower than the lower limit hardware resource quantity (see FIG. 10C). If the hardware resource quantity (network band) of the NIC 105 used by the virtual machine 121 is lower than the lower limit hardware resource quantity (yes branch from S146), processing proceeds to S147.

In S147, the performance stepdown possibility determination unit 222 determines whether a network band of the NIC 105 assigned to the virtual machine 121 may be decreased by a specific unit. If a network band resulting from decreasing the network band of the NIC 105 assigned to the virtual machine 121 by the specific unit is equal to or larger than a minimum network band of the NIC 105, the performance stepdown possibility determination unit 222 determines that the network band assigned to the virtual machine 121 may be decreased by the specific unit (yes branch from S147), and proceeds to S148. The minimum network band of the NIC 105 is 10 percent of the maximum network band of the NIC 105, for example.

In S148, the fee calculation unit 219 calculates the total usage fee Ftl with the network band decreased (modified). If the fee of the modified network band is equal to or lower than the specified fee, the performance stepup control unit 217 increases the hardware resource quantity (network band) becoming the bottleneck. Furthermore, the performance stepdown control unit 218 decreases the hardware resource quantity (network band) in redundancy. The operation in S148 of FIG. 21 is identical to the operation in S20 of FIG. 14. More specifically, the routine of FIG. 19 starting with S201 is performed.

In the routine of FIG. 19 starting with S201, the hardware resource quantity becoming the bottleneck is the network band as illustrated in FIG. 9B, and is to be increased by 0.2 Gbps. The hardware resource quantity in redundancy is the memory capacity, and is to be decreased by 0.2 GB. The fee calculation unit 219 calculates the fee if the hardware resource quantity to be assigned to the virtual machine 121 has been modified. The management control unit 211 determines whether the total usage fee Ftl is equal to or lower than the fee specified by the user (S207).

If the total usage fee Ftl is equal to or lower than the fee specified by the user (yes branch from S207 of FIG. 19), processing proceeds to S208.

In S208, the performance stepup control unit 217 instructs the virtualization unit 13 to increase the hardware resource quantity becoming the bottleneck by the specific unit (0.2 Gbps). The performance stepdown control unit 218 instructs the virtualization unit 13 to decrease the hardware resource quantity (memory capacity) in redundancy by the specific unit (0.2 GB). The subsequent operations have been described, and then processing proceeds to S126 of FIG. 18.

Processing proceeds to S126 of FIG. 18 subsequent to S148 of FIG. 21, or if the network band assigned to the virtual machine 121 is not insufficient (no branch from S146), or if the performance stepdown possibility determination unit 222 determines that it is difficult to decrease the network band assigned to the virtual machine 121 by the specific unit (no branch from S147). Subsequent to S126, processing returns to S101 of FIG. 16.

As described above, the management server apparatus of the embodiment may adjust the hardware resource quantities assigned to the virtual machine while keeping the usage fee of the virtual machine equal to or lower than the fee specified by the user.

Alternative Embodiments

In the embodiment, the increase and decrease process is performed on the hardware resource quantities with respect to a single virtual machine corresponding to a single user. The increase and decrease process may be performed on virtual machines 121, . . . , 12n respectively corresponding to a plurality of users. Similarly, the increase and decrease process may be performed on the hardware resource quantities with reference to virtual machines corresponding to a plurality of users executed by a plurality of virtual machine execution apparatuses 10, . . . and 10n.

In such a case, the management server apparatus 20 includes, on a per user basis, a specified fee table T1, an assignment table T2, a use resource quantity table T3, an upper limit resource quantity table T11, and a lower limit resource quantity table T32.

If it is determined in S115 of FIG. 17 that the increase of the disk band is difficult, the performance insufficiency detection unit 215 may determine that a higher performance HDD is present. For example, the HDD 104 used by the virtual machine 121 is an HDD coupled via serial attached SCSI, and another HDD used by the virtual machine 121 may be an HDD coupled via fiber channel (FiberChannel). In such a case, the management control unit 211 determines that a higher performance HDD is present. The management control unit 211 then stores on the memory 202 information that the HDD to be assigned to the virtual machine 121 is changed to the other higher performance HDD. A table storing a usage fee of the higher performance HDD is prepared in advance.

If it is determined in S142 of FIG. 21 that it is difficult to decrease the disk band, the performance redundancy detection unit 216 determines whether another lower performance HDD is present. If a lower performance HDD is present, the fee calculation unit 219 calculates a fee with a disk band of the lower performance HDD assigned to the virtual machine 121. If the fee with the disk band of the lower performance HDD assigned to the virtual machine 121 (the fee of the modified hardware resource quantity) is equal to or lower than the specified fee, the management control unit 211 increases the hardware resource quantity becoming the bottleneck.

Hardware resources at different performance levels may be switchably used in this way. If the available hardware resource quantity to be assigned to the virtual machine is small, a lower-performance and low-cost hardware resource may be assigned. If the available hardware resource quantity to be assigned to the virtual machine is large, a higher-performance and costly hardware resource may be assigned. In view of the virtual machine used by the user, a lower-performance hardware resource or a higher-performance hardware resource may be assigned to the virtual machine. Costs to prepare the hardware resource quantities are generally reduced. The hardware resource quantities at different performance levels are switchably used as appropriate. A range of the hardware resource quantities to be assigned to the virtual machine 121 is thus widened. The user may enjoy cloud service smoothly.

The hardware resource quantity of the HDD 104 may be a memory capacity of the HDD 104. In such a case, an adjustment process similar to that of the memory capacity of the memory 103 may be employed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management system comprising: a physical machine that controls a virtual machine to execute an information processing by using hardware resources of the physical machine; and
   a management apparatus that manages the physical machine, the management apparatus including:
   a memory configured to store data including: a specified fee; and
   an assigned resource quantity for each of the hardware resources, an upper limit resource quantity for each of the hardware resources, and a lower limit resource quantity for each of the hardware resources, and
   a processor configured to execute a procedure, the procedure including:
   determining whether a quantity of hardware resources assigned to the virtual machine needs to be increased in order to execute the information processing;
   when it is determined that the quantity of hardware resources does need to be increased, calculating a usage fee of the virtual machine resulting from an increase in the quantity of hardware resources needed to execute the information processing;
   comparing the usage fee with the specified fee;
   increasing the quantity of hardware resources assigned to the virtual machine when the usage fee is equal to or lower than the specified fee and successively iterating the determining, calculating, comparing, and increasing until the usage fee is not equal to or lower than the specified fee; and
   when the usage fee is greater than the specified fee, storing the usage fee in the memory, determining whether a first hardware resource, from among the hardware resources, is in performance redundancy in which a current resource quantity of the first hardware resource is equal to or lower than the lower limit resource quantity for the first hardware resource, calculating the usage fee based on decreasing the assigned resource quantity of the first hardware resource by a first specific unit and increasing the assigned resource quantity of a second hardware resource other than the first hardware resource by a second specific unit, the second hardware resource creating a bottleneck by having a current resource quantity that is equal to or greater than the upper limit resource quantity for the second hardware resource and, when the recalculated usage fee is equal to or lower than the specified fee, transmitting, by the processor, an instruction to the virtual machine instructing the virtual machine to decrease the assigned resource quantity of the first hardware resource by the first specific unit and to increase the assigned resource quantity of the second hardware resource by the second specific unit in order to clear the bottleneck, wherein
   the virtual machine, when receiving the instruction, transmitted by the processor, decreases the assigned resource quantity of the first hardware resource by the first specific unit and increases the assigned resource quantity of the second hardware resource by the second specific unit in order to clear the bottleneck.

2. The management system according to claim 1, wherein the data stored in the memory further indicates a unit usage fee of the first specific unit, and wherein the usage fee is calculated in accordance with the unit usage fee.

3. The management system according to claim 1, wherein the data stored in the memory further indicates a quantity of the hardware resources used by another virtual machine and a quantity of the hardware resources assigned to the another virtual machine,
   the procedure further includes:
   when the calculated usage fee exceeds the specific fee and the quantity of the hardware resources used by the another virtual machine is equal to or smaller than another specific quantity determined based on the quantity of the hardware resources assigned to the another virtual machine, calculating a second usage fee of the virtual machine based on the increase in the quantity of hardware resources needed to execute the information processing and a quantity smaller than the quantity of the hardware resources assigned to the another virtual machine, comparing the calculated second usage fee with the usage fee, and modifying the quantity of hardware resources assigned to the virtual machine and the quantity of the hardware resources assigned to the another virtual machine to respectively meet with the increase in the quantity of hardware resources needed to execute the information processing and the quantity smaller than the quantity of the hardware resources assigned to the another virtual machine when the calculated second usage fee is equal to or lower than the usage fee.

4. The management system according to claim 3, wherein the data stored in the memory further indicates a lower limit determined based on the quantity of the hardware resources assigned to the another virtual machine, and wherein the processor detects as the quantity of the hardware resources used by the another virtual machine equal to or smaller than the lower limit.

5. The management system according to claim 1, wherein each of the quantities indicates at least one of a clock count of a central processing unit, a memory capacity of a memory, a drive band of a hard disk drive, and a network band of a network.

6. A management apparatus that manages a physical machine that controls a virtual machine to execute an information processing by using hardware resources of the physical machine, the management apparatus comprising:

a memory configured to store data including: a specified fee, and an assigned resource quantity for each of the hardware resources, an upper limit resource quantity for each of the hardware resources, and a lower limit resource quantity for each of the hardware resources; and a processor configured to execute a procedure, the procedure including:

determining whether a quantity of hardware resources assigned to the virtual machine needs to be increased in order to execute the information processing;

when it is determined that the quantity of hardware resources does need to be increased, calculating a usage fee of the virtual machine resulting from an increase in the quantity of hardware resources needed to execute the information processing;

comparing the usage fee with the specified fee;

increasing the quantity of hardware resources assigned to the virtual machine when the usage fee is equal to or lower than the specified fee and successively iterating the determining, calculating, comparing, and increasing until the usage fee is not equal to or lower than the specified fee; and when the usage fee is greater than the specified fee, storing the usage fee in the memory, determining whether a first hardware resource, from among the hardware resources, is in performance redundancy in which a current resource quantity of the first hardware resource is equal to or lower than the lower limit resource quantity for the first hardware resource, recalculating the usage fee based on decreasing the assigned resource quantity of the first hardware resource by a first specific unit and increasing the assigned resource quantity of a second hardware resource other than the first hardware resource by a second specific unit, the second hardware resource creating a bottleneck by having a current resource quantity that is equal to or greater than the upper limit resource quantity for the second hardware resource and, when the recalculated usage fee is equal to or lower than the specified fee, transmitting, by the processor, an instruction to the virtual machine, instructing the virtual machine to decrease the assigned resource quantity of the first hardware resource by the first specific unit and to increase the assigned resource quantity of the second hardware resource by the second specific unit in order to clear the bottleneck.

7. A non-transitory computer-readable, recording medium storing a management program that causes a computer to execute a procedure for a management apparatus that manages a physical machine that controls a virtual machine to execute an information processing by using hardware resources of the physical machine, the procedure comprising:

storing, in a memory, a specified fee;

determining whether a quantity of hardware resources assigned to the virtual machine needs to be increased in order to execute the information processing;

when it is determined that the quantity of hardware resources does need to be increased, calculating a usage fee of the virtual machine resulting from an increase in the quantity of hardware resources needed to execute the information processing;

comparing the usage fee with the specified fee;

increasing the quantity of hardware resources assigned to the virtual machine when the usage fee is equal to or lower than the specified fee; and when the usage fee is greater than the specified fee, storing the usage fee in the memory, determining whether a first hardware resource, from among the hardware resources, is in performance redundancy in which a current resource quantity of the first hardware resource is equal to or lower than the lower limit resource quantity for the first hardware resource, recalculating the usage fee based on decreasing the assigned resource quantity of the first hardware resource by a first specific unit and increasing the assigned resource quantity of a second hardware resource other than the first hardware resource by a second specific unit, the second hardware resource creating a bottleneck by having a current resource quantity that is equal to or greater than the upper limit resource quantity for the second hardware resource and, when the recalculated usage fee is equal to or lower than the specified fee, transmitting, by a processor in the computer, an instruction to the virtual machine instructing the virtual machine to decrease the assigned resource quantity of the first hardware resource by the first specific unit and to increase the assigned resource quantity of the second hardware resource by the second specific unit in order to clear the bottleneck.

* * * * *